United States Patent [19]
Dedic et al.

[11] Patent Number: 5,442,655
[45] Date of Patent: Aug. 15, 1995

[54] DC CANCELLATION AND RESTORATION IN RECEIVING APPARATUS

[75] Inventors: Ian J. Dedic, Northolt; Dominic C. Royce, Swindon, both of United Kingdom

[73] Assignee: Fujitsu Limited, Kawasaki, Japan

[21] Appl. No.: 67,959

[22] Filed: May 27, 1993

[30] Foreign Application Priority Data

Jun. 3, 1992 [GB] United Kingdom ............... 9211712

[51] Int. Cl.⁶ .................... H03D 1/00; H04L 27/06
[52] U.S. Cl. ................... 375/340; 455/304; 455/312; 329/353; 375/261; 375/317; 375/349
[58] Field of Search ............... 329/320, 349, 353; 375/78, 76, 80, 94, 99, 58, 102, 79, 76, 39; 455/296, 304, 312

[56] References Cited

U.S. PATENT DOCUMENTS

| | | | |
|---|---|---|---|
| 4,879,729 | 11/1989 | Tarallo | 375/80 |
| 4,899,367 | 2/1990 | Sampei | 375/99 |
| 4,926,443 | 5/1990 | Reich | 329/320 |
| 5,144,256 | 9/1992 | Lim | 329/302 |
| 5,175,749 | 12/1992 | Ficht et al. | 375/94 |
| 5,321,726 | 6/1994 | Kafadar | 375/39 X |

FOREIGN PATENT DOCUMENTS 0474615  3/1992  European Pat. Off. .

OTHER PUBLICATIONS

"Digital Communications System Basics," Bill Flerchinger et al., 1992 Communications Test Symposium, Hewlett Packard Company, 1992, entire document.
"Overview of the Radio Subsystem," Dr. Heinz Ochsner, CEPT/GSM-PN, Paris, France, pp. 3a/1–3a/12.
"The GSM Radio Interface," M. R. L. Hodges, Br. Telecom. Technol. J., vol. 8, No. 1, Jan. 1990, pp. 31–43.

Primary Examiner—Stephen Chin
Assistant Examiner—Amanda T. Le
Attorney, Agent, or Firm—Staas & Halsey

[57] ABSTRACT

In receiving apparatus of a digital communication system, a received signal burst is demodulated to produce inphase (I) and quadrature (Q) baseband signals which are digitized to provide a set of signal-value pairs for the burst. Each pair consists of an I-value and a corresponding Q-value. The modulation is such that the pairs, if plotted on a complex signal space (I-Q) diagram, would lie substantially on a common circle. To cancel DC offsets in the I and Q signal paths, the average I-value and average Q-value over the burst are found and subtracted respectively from the I- and Q-values of each signal-value pair, to shift the circle so the origin of the I-Q diagram lies within the circle. Then, to restore the DC content of the I and Q signals, the distances $I_{i1}$, $Q_{i2}$, $I_{i3}$ and $Q_{i4}$ of signal-value pairs from the I- or Q-axis are averaged in four regions of the I-Q diagram. The difference between the respective average distances for mutually-opposed regions is used to derive I- and Q-direction shift values which, if subtracted respectively from the I- and Q-values of each signal-value pair, would bring the centre of the circle closer to the origin. This can remove DC offsets accurately, whilst preserving the variable DC content of the received signal, in time periods consistent with the burst repetition rate in communication systems such as Global System for Mobile Communications (GSM), thereby permitting correct operation of an equalizer used to extract data from the I- and Q-values.

13 Claims, 16 Drawing Sheets

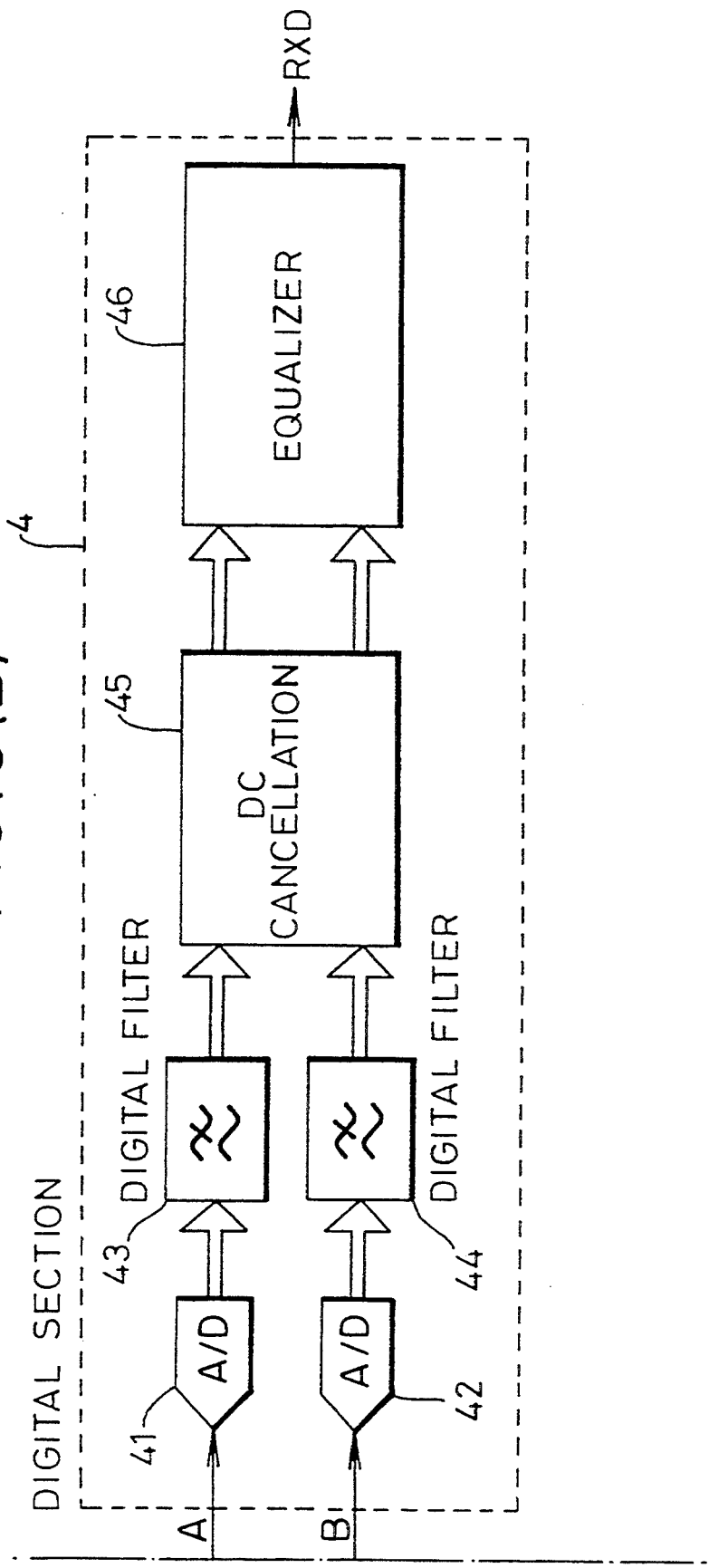

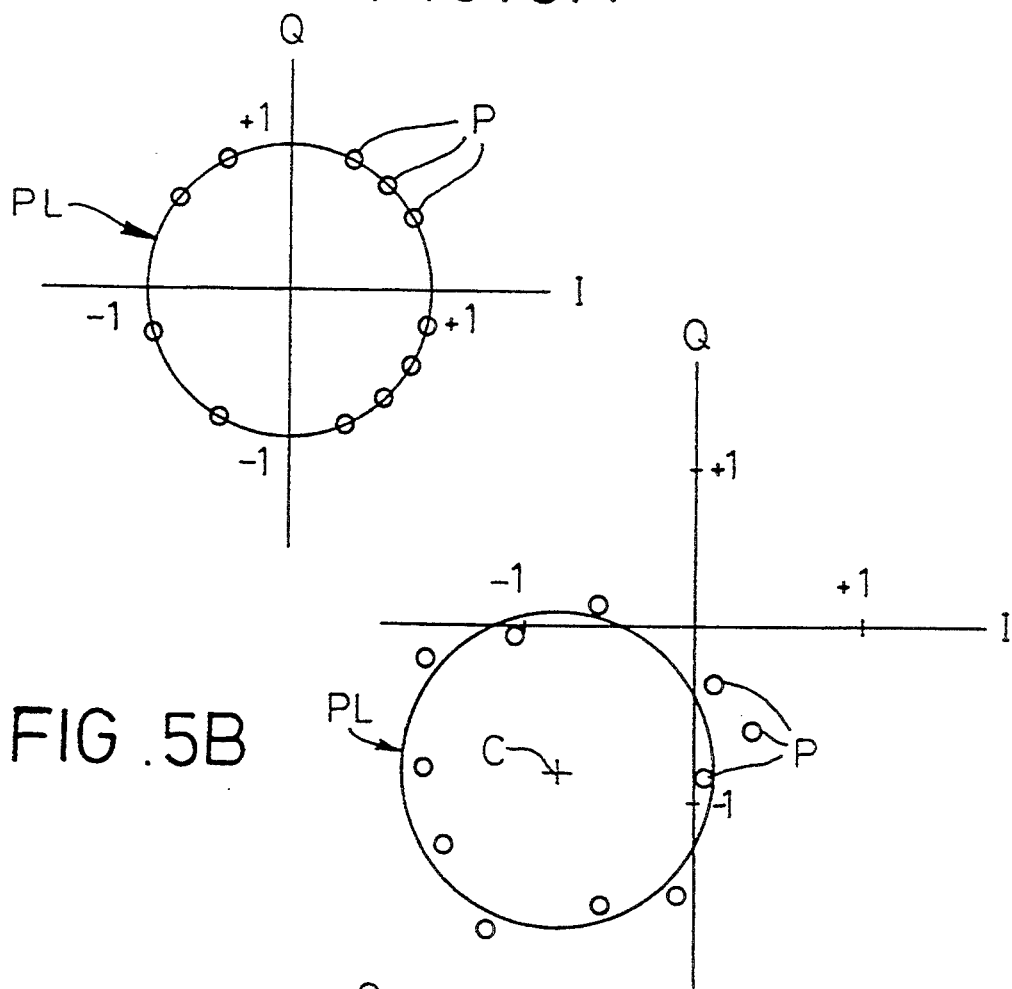
FIG. 5A
FIG. 5B
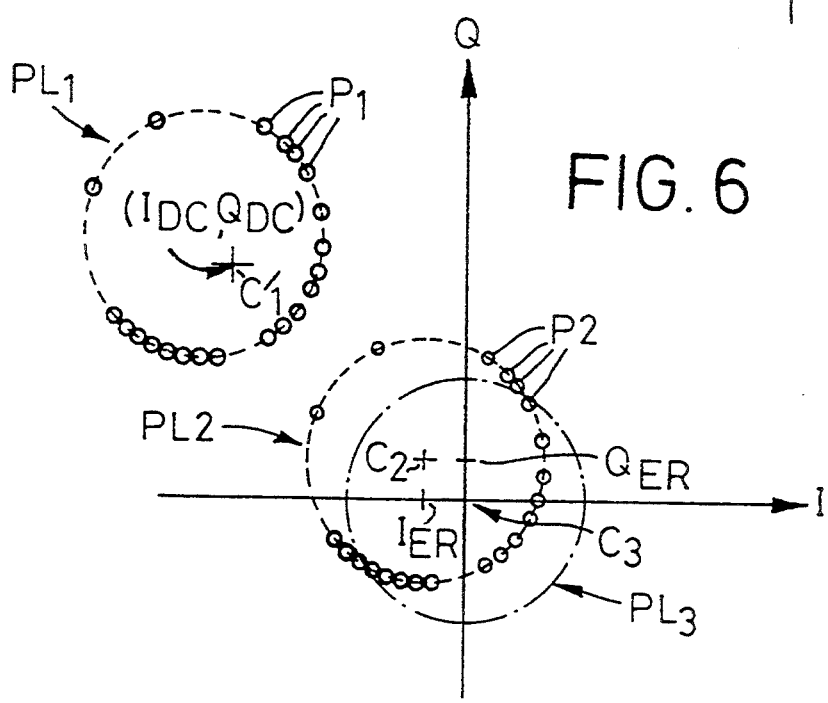
FIG. 6

DC CANCELLATION AND RESTORATION IN RECEIVING APPARATUS

BACKGROUND OF THE INVENTION

The present invention relates to signal error reduction in receiving apparatus, for example signal error reduction in a receiver operable as part of a GSM (Global System for Mobile Communications) digital radio communication system.

In a digital communication system, a transmission signal is produced by modulating a carrier signal with the digital data to be transmitted. The digital data is commonly transmitted in bursts, each burst consisting of a predetermined number of data bits. Various different types of modulation may be used, of which amplitude, frequency and phase modulation are the most common.

In receiving apparatus of such a digital communication system, the received signal must be demodulated to derive therefrom the information content (transmitted digital data). In one demodulation technique, referred to as direct down conversion, in the receiving apparatus a complex (quadrature pair) local oscillator operating at the carrier frequency is used to mix down the received signal to produce inphase (I) and quadrature (0) baseband signals, also referred to sometimes as zero IF signals. Alternatively, such I and Q baseband signals may be produced after processing in an intermediate frequency (IF) stage.

These inphase and quadrature baseband signals can then be processed, for example on a burst-by-burst basis, to derive therefrom the information content of the received signal.. It is convenient to carry out such processing as far as possible in the digital domain, and for this reason the inphase and quadrature baseband signals in all of the bit periods of a burst may be converted into a set of digital I and Q signal-value pairs, each pair comprising an I-value and a corresponding Q-value representing respectively the inphase and quadrature baseband signals in a particular bit period.

The digital I- and Q-values of such signal-value pairs can be used to analyze the received signal for the purposes of extracting the information content therefrom. In particular, for a phase- or frequency-modulated constant-amplitude received signal the signal-value pairs would, if plotted on a complex signal space diagram (I/Q diagram), lie substantially on a common circle, the angular positions of the plotted signal-value pairs with respect to the circle centre being then used by a digital equalizer to derive raw data from the signal-value pairs.

However, performance of a such a digital equalizer is found to be degraded seriously by DC errors in the I- and Q-values of the signal-value pairs. Such DC errors may arise due to mismatches between the down conversion mixers used to produce the analog baseband inphase and quadrature signals, and due to DC offsets in the analog signal processing circuitry, used to process those baseband signals prior to conversion into digital signal-value pairs.

These DC errors may vary with time and temperature, and may also be larger than the amplitude of the wanted signal in the case of weak signals.

It is possible to remove DC errors that are larger than the signal amplitude by averaging the I-values of all the signal-value pairs over a burst and then subtracting the average I-value from the I-value of each pair, and by averaging the Q-values of all the signal-value pairs over a burst and subtracting the average Q-value from the Q-value of each pair. These DC cancellation operations must be carried out separately for I and Q, because the DC errors in I- and Q-values will be different and unrelated.

These DC cancellation operations (average subtraction) are not however, sufficient alone to deal with the DC error problem. Subtracting the average signal level actually introduces a new DC error of its own because it removes all DC from the received signal, whereas in practice the received signal itself will almost certainly have a DC content which should not be removed. The DC content is not constant, and varies from one burst to the next according to the digital data included in the burst. There is therefore, a need for a way of restoring this variable DC content to the received signal following an initial DC cancellation operation and such a DC restoration operation must be performed in a short time period consistent with the burst repetition rate of the communication system.

BRIEF SUMMARY OF THE INVENTION

According to a first aspect of the present invention there is provided a method of processing a received signal comprising a carrier wave modulated with digital data signals. In the method the received signal is demodulated to produce a set of digital baseband signal-value pairs, each pair being made up of an inphase signal value and a corresponding quadrature signal value. The values are such that, if plotted on an I-Q diagram with the inphase signal value of each pair denoting distance of a plotted point from a Q-axis and the quadrature signal value of that pair denoting distance of that plotted point from an I-axis that is orthogonal to the Q-axis, the plotted points would lie substantially on a first circle whose centre is offset from the origin of the diagram, the origin being at the intersection of the I- and Q-axes.

Such inphase signal values are averaged to produce an I-direction mean value, and such quadrature signal values are averaged to produce a Q-direction mean value. The I-direction mean value and the said Q-direction mean value are subtracted respectively from the inphase signal value and the quadrature signal value of each of the signal-value pairs so as to produce a set of adjusted signal-value pairs which, if plotted on the said I-Q diagram, would produce a new set of plotted points lying substantially on a second circle such that the origin lies within that circle.

First, second, third and fourth regions of the I-Q diagram are then defined, the first and third regions being symmetrical to one another with respect to the said Q-axis, and the second and fourth regions being symmetrical to one another with respect to the said I-axis. For each of the said first and third regions, the average distance between the said Q-axis and points of the new set that are located within the region concerned is determined, and the difference between these determined average distances is used to produce an I-direction shift value which, if subtracted from the inphase signal values of the points of the new set, would cause the centre of the second circle to move closer to the Q-axis. Similarly, for each of the said second and fourth regions, the average distance between the said I-axis and points of the new set that are located within the region concerned is determined, and the difference between these determined average distances is used to produce a Q-direction shift value which, if subtracted from the quadrature signal values of the points of the new set, would cause the centre of the second circle to move closer to the I-axis.

Finally, the I-direction shift value is subtracted from each of the inphase signal values of the points of the said new set, and the Q-direction shift value is subtracted from each of the quadrature signal values of those points, the resulting inphase and quadrature values being delivered as output signals.

Such a method can provide cancellation of DC offsets in the I and Q baseband signal paths, even when those offsets are larger than the signal amplitudes, whilst restoring accurately the DC content of the received signal, and can operate sufficiently quickly to afford real-time processing of received signal bursts. For example, because the distances of points of the new set from the I or Q axes are represented by the quadrature and inphase values respectively of the adjusted signal-value pairs, the average distance calculations can be performed quickly using those values.

Preferably, the regions are quadrants delimited by first and second orthogonal lines that intersect at the origin, the angle between the first line and the Z-axis being 45°. Such region definitions can enable the adjusted signal-value pairs, for use in the DC restoration operation, to be sorted quickly into the different regions, using only simple comparisons based on the inphase and quadrature signal values of each pair.

When the regions are defined as quadrants, the I-direction shift value is preferably substantially equal to the above-mentioned difference, between the respective average distances for the first and third regions, divided by 1.8, and the Q-direction shift value is preferably substantially equal to the above-mentioned difference, between the respective average distances for the second and fourth regions, divided by 1.8. Such shift values include a correction factor appropriate to correct for errors in the calculation of the respective average distances for the quadrants.

Preferably, all of the points of the new set that are located in each region are used to determine the average distance for the region, since this should give the best accuracy.

According to a second aspect of the present invention there is provided apparatus for processing a received signal comprising a carrier wave modulated with digital data signals. The apparatus comprises demodulation means for demodulating the received signal to produce a set of digital baseband signal-value pairs, each pair being made up of an inphase signal value and a corresponding quadrature signal value. These values are such that, if plotted on an I-Q diagram with the inphase signal value of each pair denoting distance of a plotted point from a Q-axis and the quadrature signal value of that pair denoting distance of that plotted point from an I-axis that is orthogonal to the Q-axis, the plotted points would lie substantially on a first circle whose centre is offset from the origin of the diagram, the origin being at the intersection of the I- and Q-axes. The apparatus also comprises averaging means for averaging such inphase signal values to produce an I-direction mean value, and for averaging such quadrature signal values to produce a Q-direction mean value. Additionally, the apparatus comprises first adjustment means for subtracting the I-direction mean value and the Q-direction mean value respectively from the inphase signal value and the quadrature signal value of each of the signal-value pairs so as to produce a set of adjusted signal-value pairs which, if plotted on the said I-Q diagram, would produce a new set of plotted points lying substantially on a second circle such that the origin lies within that circle.

Region defining means are provided for defining first, second, third and fourth regions of the I-Q diagram, the first and third regions being symmetrical to one another with respect to the Q-axis, and the second and fourth regions being symmetrical to one another with respect to the I-axis.

The apparatus also comprises I-shift calculating means operable, for each of the first and third regions, to determine the average distance between the Q-axis and points of the new set that are located within the region concerned, and to use the difference between these determined average distances to produce an I-direction shift value which, if subtracted from the inphase signal values of the points of the new set, would cause the centre of the second circle to move closer to the Q-axis. Similarly, Q-shift calculating means of the apparatus are operable, for each of the said second and fourth regions, to determine the average distance between the I-axis and points of the new set that are located within the region concerned, and to use the difference between these determined average distances to produce a Q-direction shift value which, if subtracted from the quadrature signal values of the points of the new set, would cause the centre of the second circle to move closer to the I-axis. Second adjustment means serve for subtracting the said I-direction shift value from each of the inphase signal values of the points of the said new set, and for subtracting the Q-direction shift value from each of the quadrature signal values of those points, and for delivering the resulting inphase and quadrature values as output signals.

Such apparatus can make use of simple digital circuitry elements or a microprocessor to perform the required processing.

The apparatus preferably further includes a memory, for storing the inphase and quadrature signal values of all the adjusted signal-value pairs. Sorting means are connected with the memory for receiving therefrom the stored inphase and quadrature values of such adjusted signal-value pairs in turn. When the regions of the I-Q diagram are defined as quadrants, as mentioned above, the sorting means may include comparator means operative, for each adjusted signal-value pair received from the said memory, to compare the inphase signal value of the pair with zero and to compare the quadrature signal value of the pair with zero and to compare the respective inphase and quadrature signal values for the pair, and may also include selection means connected to the said comparator means and operative, in dependence upon the results of the comparisons performed thereby, to produce selection signals indicative of the region (quadrant) in which the adjusted signal-value pair lies. Such sorting means can operate quickly, and can be implemented using only simple digital circuitry elements.

In one embodiment the I-direction shift calculating means include two average distance calculating circuits, for the first and third regions respectively, and the Q-direction shift calculating means include a further two average distance calculating circuits, for the second and fourth regions respectively. Each of these average distance calculating circuits includes accumulator means connected for calculating a sum of the respective distances of points of the new set that are located within the region concerned, and counter means connected for counting the number of such points used to calculate the above-mentioned sum. Divider means are connected with the accumulator means and the counter means, and are operable to divide the above-mentioned sum by the above-mentioned number to produce the average distance for the region concerned.

Such average distance calculation circuits may be connected to the sorting means for activation in dependence upon the above-mentioned selection signals produced thereby. There may be divider means in each average distance calculation circuit, or alternatively the divider means can be common to all four circuits.

The counter means of the averaging distance calculation circuit may be arranged to count, and sum distances for, all of the points in the region concerned, but only to deliver as outputs to the divider means the above-mentioned number and sum for a predetermined number of the points in the region. This can enable the divider means to be simplified. For example, in a preferred embodiment the divider means are operative to produce the average distance by means of a shifting operation or a shifting-and-adding operation performed on the above-mentioned sum, which operation is selected in dependence upon the above-mentioned number. This can permit the average distances to be calculated without the use of a divider, which is complex to implement in digital circuitry. The shifting-and-adding operation can be simple, for example consisting of just two shifting operations and a single adding operation.

When the regions are defined as quadrants, the selected shifting operation or shifting-and-adding operation is preferably such that the above-mentioned sum is divided by a factor equal to the above-mentioned number divided by 1.125, since 1.125 is close to the above-mentioned correction factor appropriate for quadrants.

Embodiments of the aforesaid first and second aspects of the present invention may be employed advantageously in a radio receiver operable in a digital radio communication system such as a GSM system or a Personal Communications Network (PCN) system. For example such a receiver may include a radio-frequency receive portion for receiving a radio signal to be demodulated, and apparatus, embodying the aforesaid second aspect of the present invention, connected to the radio-frequency receive portion for processing the received radio signal. The apparatus is also connected for delivering its output signals to further circuitry of the radio receiver used to derive data from those output signals.

BRIEF DESCRIPTION OF THE DRAWINGS

Reference will now be made, by way of example, to the accompanying drawings in which:

FIGS. 3A and 3B together present a block diagram of GSM receiving apparatus including a DC cancellation circuit embodying the present invention;

FIGS. 5A and 5B are respective I/Q diagrams for explaining the effects of DC errors in the FIG. 3 receiving apparatus;

FIG. 6 is an I/Q diagram for illustrating operation of the DC cancellation circuit in the FIG. 3 receiving apparatus;

DETAILED DESCRIPTION OF THE PREFERRED EMBODIMENTS

Before describing preferred embodiments of the present invention, a brief explanation will be given of the application of inphase and quadrature (I and Q) signals. Such signals provide a way of representing a complex signal in a cartesian co-ordinate system.

I and Q signals can be used to examine modulation schemes. Most modulation schemes involve changes in amplitude and/or phase, and these can be plotted out on an I/Q diagram by converting the polar (amplitude and phase) co-ordinates into rectangular (I and Q) coordinates.

Figure 1:
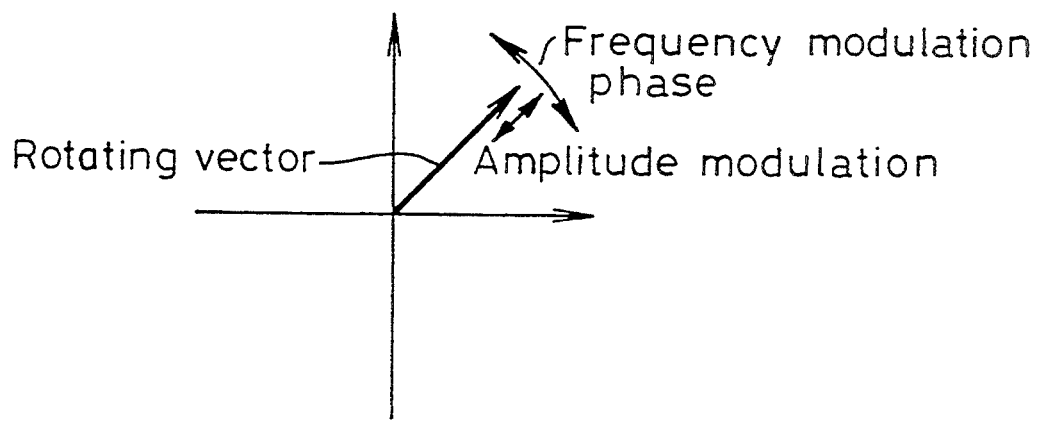
FIG. 1 shows a representation of a sine wave carrier signal for explaining the effects of different kinds of modulation of the carrier.

To understand how I and Q signals are produced it is convenient to consider RF (or IF) carriers. Referring to FIG. 1, a sine wave carrier may be represented in a cartesian co-ordinate system as a rotating vector of constant length. Modulation will cause the vector to change amplitude, jump forward or backward in phase, and change the frequency of its rotation.

Figure 2A:
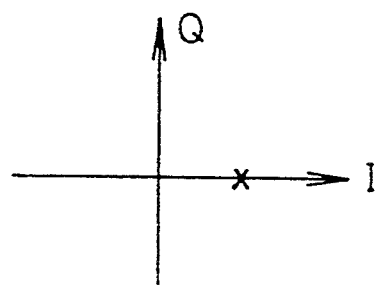
FIGS. 2A to 2D are respective I/Q diagrams for illustrating common forms of digital modulation.

If the vector is now notionally rotated backwards at the carrier frequency, for example by subtracting a signal in phase with the unmodulated carrier, the unmodulated carrier itself will appear as a point on the x-axis, with the amplitude given by the x-value, as shown in FIG. 2A.

In FIGS. 2A to 2D, which are respective complex signal-space (I/Q) diagrams, inphase signal values are measured along the x-axis (I-axis) and quadrature signal values are measured along the y-axis (Q-axis). This agrees with the standard cartesian definition of phase being measured anti-clockwise from the x-axis.

Figure 2B:
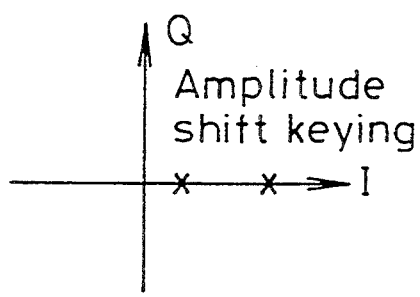
Figure 2C:
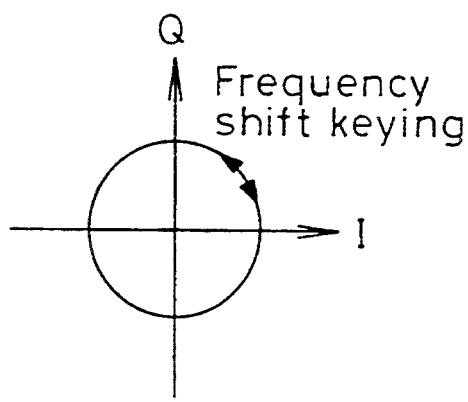
Figure 2D:
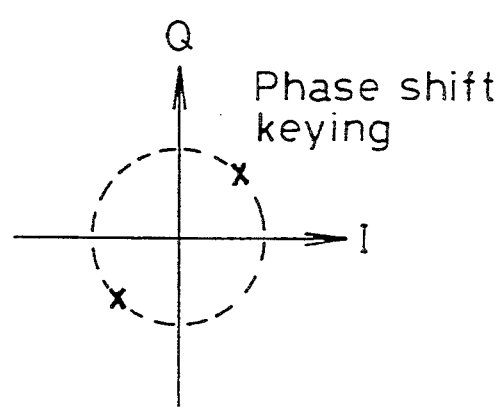

The three most common forms of digital modulation are amplitude modulation (amplitude shift keying), frequency modulation (frequency shift keying) and phase modulation (phase shift keying). Amplitude shift keying, as shown in FIG. 2B, appears as two points on the x-axis, these two points representing the two different amplitude values of the modulated carrier, the signal always being inphase. Frequency shift keying, as represented in FIG. 2C, appears as a rotation around a circle at a constant speed, but with the direction of rotation reversing each time the digital modulating symbol changes. Phase shift keying, as represented in FIG. 2D, appears as two points 180° apart on a circle.

More complex modulation schemes, such as quadrature amplitude modulation (QAM), can also be represented and can appear, for example, as constellations of points on such complex signal space (I/Q) diagrams.

The diagrams shown in FIG. 2 were produced by rotating the RF vector backwards at its carrier frequency. This is analogous to mixing down a received carrier signal with a complex (quadrature pair) local oscillator operating at the same frequency as the carrier (direct down conversion). Such mixing down produces inphase (I) and quadrature (Q) baseband signals, sometimes referred to as zero IF signals.

If the modulation consists of a sine wave at a frequency $\Delta f$ above the carrier frequency, at baseband this modulation appears as a sine wave at frequency $\Delta f$. On an I/Q diagram such a sine wave would appear as a rotation around a circle, in a particular direction, and the I and Q signals for such a sine wave may be defined as follows:

$$I = A \cos \Delta f \text{ and } Q = A \sin \Delta f$$

If, instead of being at a higher frequency than the carrier, the modulating sine wave was lower in frequency than the carrier, at baseband it would rotate in the opposite direction around the circle, but the I signal would be unchanged. Also, if I and Q were reversed, the signal would appear to rotate in the opposite direction.

It thus follows that, for correct demodulation, it is necessary to have both I and Q signals present at baseband, and that these signals must be connected the correct way round.

Figure 3A:
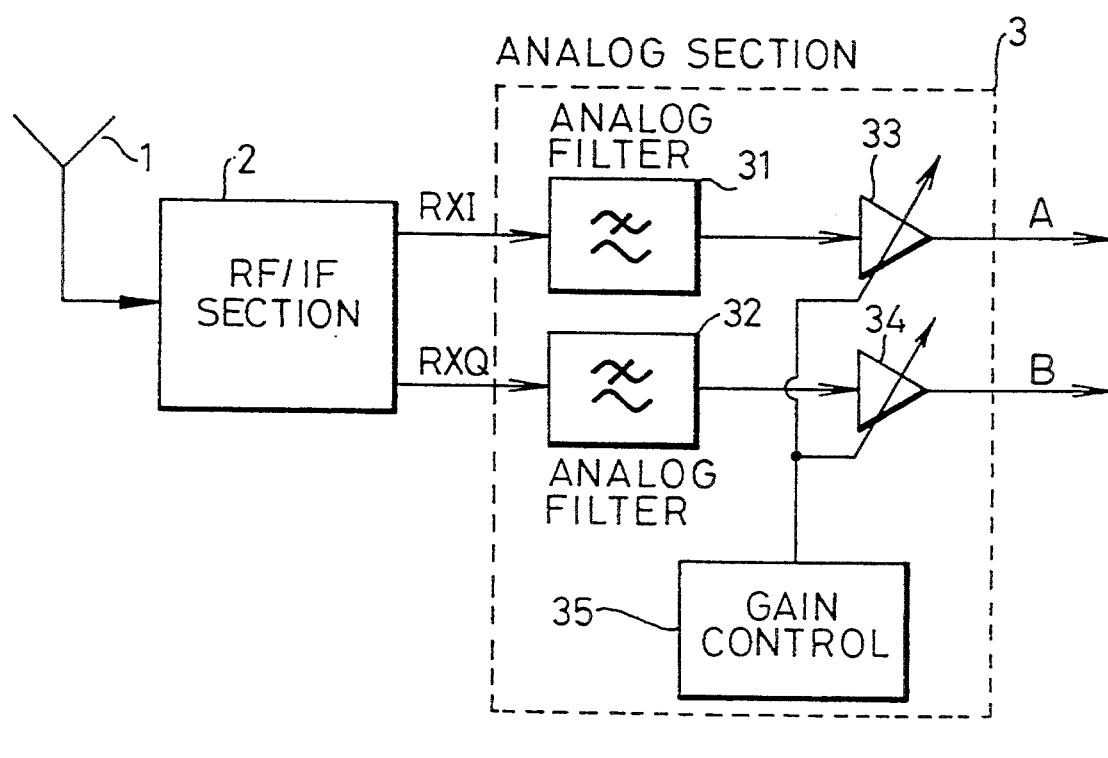

As mentioned above, the direct down conversion performed by certain types of radio receiver produces inphase (I) and quadrature (Q) baseband signals for demodulation purposes. A description of one such radio receiver, for use in a GSM communication system, will now be given with reference to FIGS. 3A and 3B.

GSM (Global System for Mobile Communications) is a digital cellular radio communication system. The GSM system is a time division multiple access and frequency division duplex (TDMA/FDD) system, employing frequency hopping, as described in more detail for example in Flerchinger, W. and Thompson, K. "Digital Communications Systems Basics", Hewlett-Packard Test Symposium on Digital RF Communications, London, 26 March 1992; Oschner, H. "Overview of the Radio Subsystem", Digital Cellular Radio Conference, Hagen, Germany, October 1988; and Hodges, M.R.L. "The GSM Radio Interface" British Telecom Technology Journal Vol. 8 No. 1 January 1990.

The modulation type used in GSM is Gaussian minimum shift keying (GMSK). Because time division multiple access is used, data is transmitted in signal bursts. As described more fully in GSM recommendations 5.02 and 5.2, four types of signal burst are used: normal bursts, synchronization burst, monitor bursts and frequency correction bursts.

Most data appears in the form of normal bursts, irrespective of which logical channel is being received. Each normal burst is nominally 148 symbol periods (bit periods) long and has a training sequence in the middle.

Synchronization bursts are only available on a broadcast control channel (BCCH) carrier and have an extra-long training sequence in the middle to aid synchronization, but are still 148 symbol periods long.

Monitor bursts do not carry data and accordingly demodulation of the received signal during such bursts is not required in the receiving apparatus, which merely needs to measure the average power of the received signal over a predetermined time period.

Frequency correction bursts are less relevant to the present application and will not be described further herein.

The FIG. 3 receiving apparatus includes an antenna 1, an RF/IF section 2 connected to the antenna 1 for receiving RF signals picked up thereby, and received signal processing circuitry, connected to the RF/IF section 2, comprising an analog section 3 and a digital section 4.

The RF/IF section 2 serves to generate I and Q analog baseband signals RXI and RXQ by mixing down the received radio signal from the antenna 1 with a complex (I and Q) local oscillator operating at the carrier frequency of the received signal.

The baseband signals RXI and RXQ are applied to respective analog filters 31 and 32 in the analog section 3 of the above-mentioned received signal processing circuitry. These filters are required to filter the RXI and RXQ signals sufficiently to prevent aliasing in the subsequent digital section 4.

Then, in order to overcome quantization noise, the filtered analog baseband signals are applied to respective switched-gain stages 33 and 34 which serve to amplify the signals in dependence upon a gain control circuit 35. The gain may, for example, be changed in steps of 6 dB, and is held for the duration of a signal burst.

The amplified analog baseband signals are then applied to respective 16-bit analog-to-digital converters 41 and 42 where they are sampled and converted into successive 16 bit digital I and Q values. It will be understood that the number of bits in each digital I or Q value need not be 16. The converters 41 and 42 may have a sampling rate higher than the symbol rate.

The 16-bit I- and Q-digital values from the converters 41 and 42 are applied to respective digital filters 43 and 44 which serve to filter out the adjacent and alternate channels. If necessary, the filters 43 and 44 also reduce the sampling rate to one sample per symbol so as to deliver, in each symbol period of a received signal burst, a digital baseband signal-value pair made up of a 16-bit inphase signal value (I-value) from the filter 43 and a corresponding 16-bit quadrature signal value (Q-value) from the filter The signal-value pairs are applied to a DC cancellation circuit 45, described in detail below, which serves to cancel DC offsets in and between the I- and Q-values of the pairs prior to application of the signal-value pairs to a digital equalizer 46. This equalizer 46 demodulates the I- and Q-values into raw data RXD for application to a channel decoder (not shown) of the receiving apparatus by which the raw data is decoded. The equalizer 46 may be considered as an adaptive matched filter followed by a maximum likelihood sequence estimator.

To deal with normal bursts the equalizer requires 154 signal-value pairs (samples), to deal with synchronization bursts 174 pairs, to deal with the monitor bursts an optional number of pairs, and to deal with frequency correction bursts it requires a continuous input at the rate of one pair per symbol. Although normal bursts and synchronization bursts are only 148 samples long, the required extra signal-value pairs are produced by taking samples of the received signal before and after a burst is scheduled.

It has been found that, in the FIG. 3 receiving apparatus, significant DC offsets of and between the digital I- and Q-values can arise due to mismatches between down conversion mixers in the RF/IF section 2 and DC offsets in the analog section 3. These offsets may also vary with time and temperature.

The DC offsets at the input to the analog section 3 may be of the order of a few millivolts, which is considerably larger than the amplitude of the wanted signal in the case of weak signals. If not removed, offsets of this size would prevent correct operation of the equalizer 46.

Indeed, simulations have shown that, to avoid performance degradation in the equalizer, the DC offsets of the I- and Q-values should be kept to less than a few percent of the signal amplitude. It is for this reason that the FIG. 3 receiving apparatus employs a DC cancellation circuit 45, arranged in the digital section 4 between the digital filters 43 and 44 and the equalizer 46, which is capable of cancelling, with the desired accuracy, DC offsets that may be considerably larger than the signal amplitude.

Figure 4A:
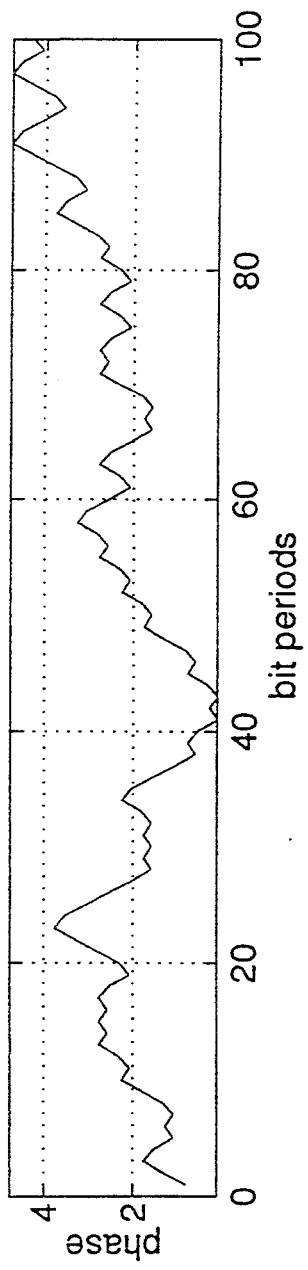
FIGS. 4A to 4C show signal waveforms generated by the FIG. 3 receiving apparatus.
Figure 4B:
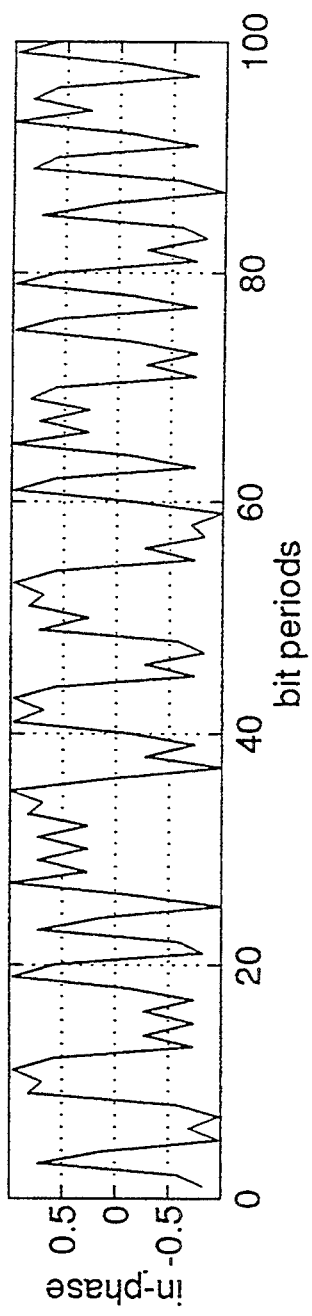
Figure 4C:
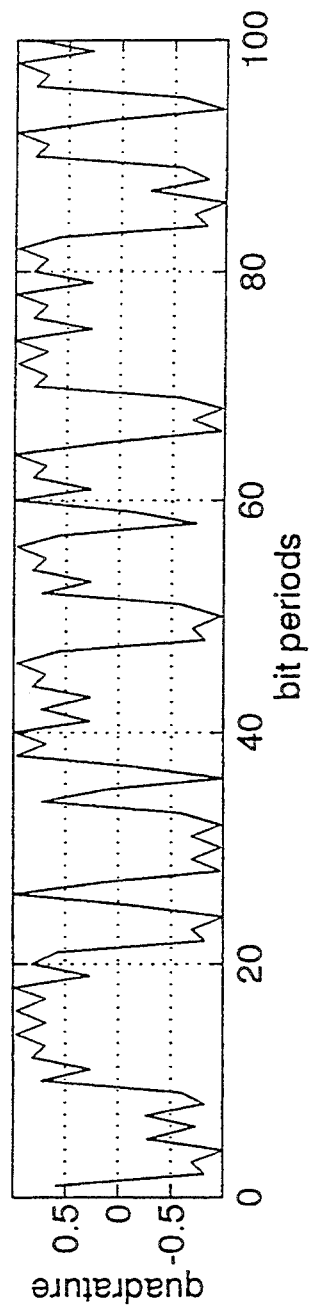

FIGS. 4B and 4C show diagrammatic representations of the above-mentioned I and Q signal-value pairs produced by the digital filters 43 and 44 in each bit period during a received signal burst (in this case the burst being shown as consisting of 100 bit periods for explanation purposes). FIG. 4A shows the received signal phase trajectory over the burst.

The I- and Q-values as shown in FIGS. 4B and 4C are normalized and are free from DC offsets, and so vary in amplitude between $-1$ and $+1$. The nominal (noise- and interference-free) relationship between the I-and Q-values of an I-Q signal-value pair in each bit period may be expressed as $$I^2+Q^2=1,$$

so that, if plotted on an I-Q cartesian diagram, the plotted points P would trace out a common circle PL centred on the origin, as shown in FIG. 5A.

In practice, however, noise, interference and multipath distortion cause the plotted points to deviate from the common circle somewhat, and also DC offsets shift the centre of the circle away from the origin, as shown for example in FIG. 5B.

The DC offsets in the I- and Q-values can vary from one burst to the next, for example undergoing drift with signal conditions and temperature. Thus, regular DC cancellation operations are required. Although in theory it would be possible to use regular "set-up" periods, in which all the receiver circuits are switched on, except the RF ones, so that a DC offset with no input signal can be stored for subtraction from the received signal during normal reception, in practice it is difficult to schedule such "set-up" periods when the receiver is in full-time use. It is therefore preferred to cancel the DC on each burst as it arrives. This has the advantage that, because cancellation is done on a burst-by-burst basis, no relationship between successive bursts is assumed.

DC offsets in the I- and Q-values can be removed by subtracting from each I-value the average I-value over a burst (or a representative part of the burst, if required) and by subtracting from each Q-value the average Q-value over the burst or part thereof, i.e.

$$I_i \leftarrow I_i - I_{DC} \quad \ldots (1)$$

$$Q_i \leftarrow Q_i - Q_{DC} \quad \ldots (2)$$

where $$I_{DC} = \Sigma I_i / n \quad \ldots (3)$$

and $$Q_{DC} = \Sigma Q_i / n \quad \ldots (4)$$

and n is the number of signal-value pairs in the burst or part thereof.

In practice it is convenient to choose $n = 2^P$, where $P = 7$ for example, since this enables the required average $I_{DC}$ or $Q_{DC}$ of equations 3 or 4 to be calculated easily, using simple digital circuitry, by accumulating the n I- or Q-values, to sum them, followed by a shift of P places to achieve division by n. The $2^P$ signal-value pairs in such a case may be the central $2^P$ pairs, for example central 128 pairs, of a received burst which will include the training sequences in GSM normal and synchronization bursts.

The average subtraction is done separately in the I and Q paths because the DC offsets in I-values and Q-values will be different and unrelated.

Incidentally, it will be understood that, since the average I- and Q-values are calculated for a burst, it is necessary for the DC cancellation circuit 45 to store all the digital I- and Q-values for a particular burst as they are received from the filters 43 and 44. To this end, the DC cancellation circuit 45 includes a memory portion capable of storing up to 174 signalvalue pairs (corresponding to the length of the synchronization burst which is the longest burst that is required to be processed).

In communication systems such as GSM, in addition to undesired DC offsets, the I- and Q-values have a variable DC content, due to the nature of the data being received in a particular burst. When plotted on an I/Q diagram, a received signal having a DC content will still trace out a common circle. However, there will tend to be a preponderance of plotted points in particular parts of the circle, rather than equal numbers of points in all parts. This is because the modulation, which is determined by the data being transmitted in the burst, causes the signal to spend unequal amounts of time on the different parts of the circle. This effect is shown in FIG. 6, in which exemplary I-Q signal value pairs $P_1$ trace out a first circle $PL_1$ whose centre is offset from the origin of the I/Q diagram due to undesired DC offsets.

As shown in FIG. 6, the circle $PL_1$ has more points $P_1$ in its lower half than in its upper half, and more points in its right-hand half than in its left-hand half. This means that the average I-value, namely $I_{DC}$ as defined in equation 3 above, lies in the lower half of the circle $PL_1$. Similarly, the average Q-value, namely $Q_{DC}$ as defined in equation 4 above, lies in the right-hand half of the circle $PL_1$. The point $C'_1$ defined by $I_{DC}$ and $Q_{DC}$ is therefore a poor approximation to the true centre of the circle $PL_1$.

For this reason, merely subtracting $I_{DC}$ and $Q_{DC}$ respectively from the I-value and the Q-value of each of the signal-value pairs, as carried out by equations 1 and 2, does not serve to shift the plotted points onto a circle centred on the origin, as is desired. Instead, the shifted points $P_2$ lie on a second circle $PL_2$ which includes the origin, but the true centre $C_2$ of this circle does not coincide with the origin.

Thus, it can be seen that applying equations 1 and 2 above introduces an error by removing the DC content of the signal along with the undesired DC offset. This error is represented in FIG. 6 by an I error value $I_{ER}$, representing the distance of the true centre $C_2$ of the second circle from the Q-axis, and a Q error value $Q_{ER}$ representing the distance between the true centre $C_2$ and the I-axis.

It will be noted that, as shown in FIG. 6, the origin of the I-Q diagram lies within the second circle $PL_2$ produced by subtracting the average I and Q values. This is because, in the case of GSM normal and synchronization bursts, the training sequences are known, and the modulation due to these sequences always rotates the received signal at least once around the first circle $PL_1$. The average of the I- and Q-values, namely $I_{DC}$ and $Q_{DC}$ respectively, will thus always lie within the first circle $PL_1$, with the result that the above-mentioned error values $I_{ER}$ and $Q_{ER}$ will always be less than the signal amplitude (represented by the radius of the circles). In fact, simulations have indicated that these error values are usually reduced to within ±13% of the signal amplitude.

As noted above, however, to avoid performance degradation, the DC offset of the I-values or Q-values should be kept to less than a few percent of the signal amplitude. Thus, merely subtracting the average I and Q values will not be sufficient in certain applications such as the GSM application represented in FIG. 3.

For this reason, the initial DC cancellation operation (average subtraction) must be followed by a DC restoration operation to restore the DC content of the signal, i.e. to shift the second circle $PL_2$ so that it is centred on the origin, as shown by the circle $PL_3$. Incidentally, in FIG. 6, for the sake of clarity no points have been plotted on the circle $PL_3$.

It is not possible for the DC cancellation circuit 45 to restore the DC content of the received signal by reference to the modulation of a received burst, since this modulation depends on the data being transmitted, which data is unknown to this part of the receiving apparatus. Thus, DC restoration must be based on the I-Q signal-value pairs themselves.

It is a general requirement of the digital section 4 of the receiving apparatus shown in FIG. 3 that there should be low latency, i.e. the delay imposed on the received signal by the digital processing performed by the digital section 4 should be as low as possible. A related requirement is low processing complexity, so that the digital section 4 consumes low power and requires only a small chip area. Accordingly it is desirable to avoid the use of multipliers and to keep look-up requirements small, and to use common circuitry elements wherever possible to process the different types of burst.

A preferred implementation of the DC restoration operation, consistent with the above requirements, will now be described with reference to FIGS. 7, 8 and 9A.

Figure 7:
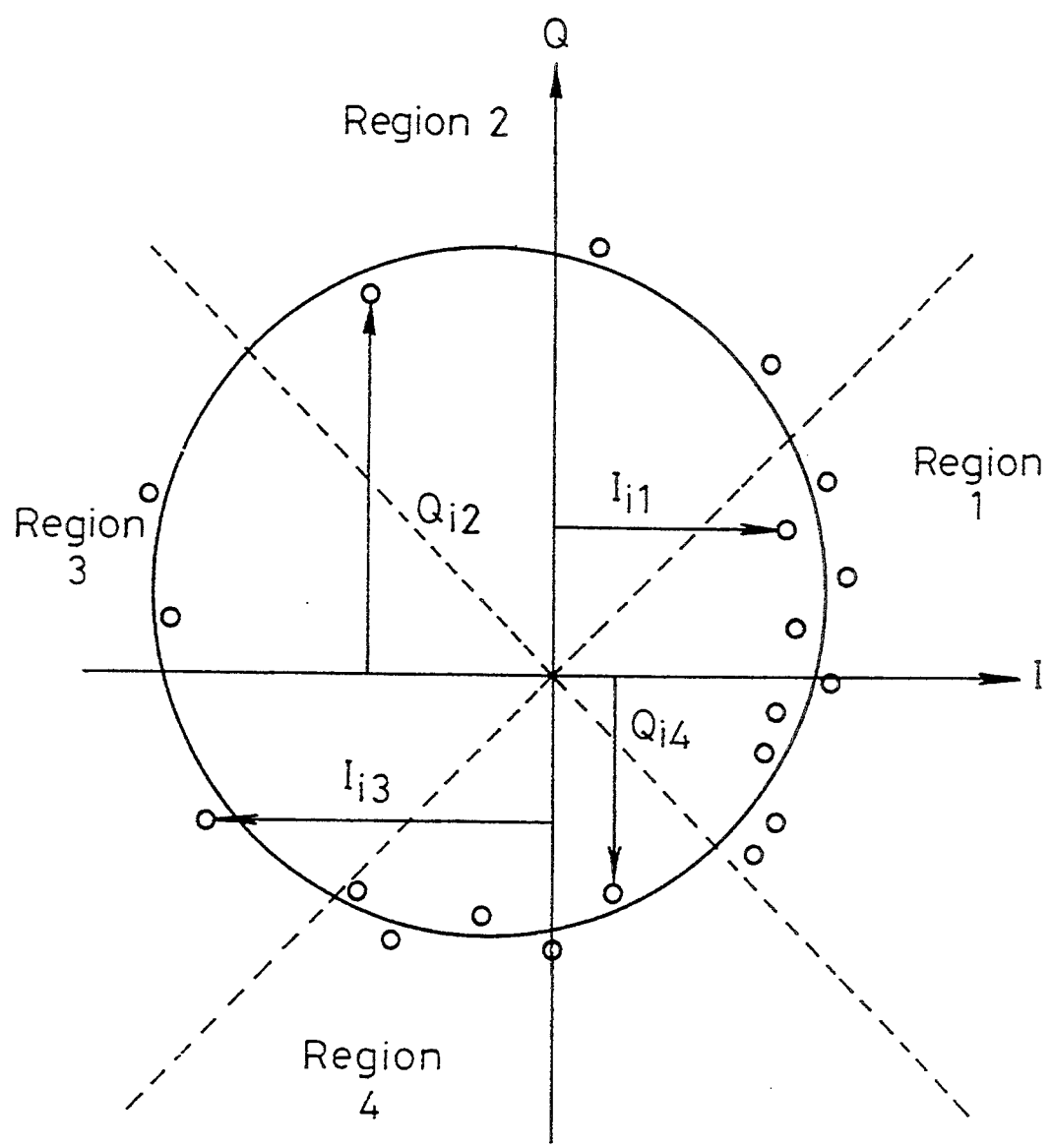
FIG. 7 is an I/Q diagram illustrating a DC restoration operation carried out by the DC cancellation circuit.

FIG. 7 presents an I/Q diagram showing the position of the I-Q signal-value pairs after average subtraction. Thus, the circle traced out by the points (signal-value pairs) in FIG. 7 corresponds to the second circle $PL_2$ in FIG. 6.

In FIG. 7, the I-Q diagram is divided into four regions 1 to 4 which in this example are quadrants. The quadrants are delimited by orthogonal lines, shown as dotted lines in FIG. 7, which intersect at the origin. These lines bisect the four quadrants defined by the I- and Q-axes. Thus, region 1 extends within the angular range from −45° to +45°, region 2 extends from +45° to +135°, region 3 extends from +135° to 225°, and region 4 extends from +225° to +315° (−45°). The reason for defining the regions in this way will be explained later in this specification, with reference to FIG. 9A.

In order to estimate the respective amounts $I_{ER}$ and $Q_{ER}$, in the I-axis and Q-axis directions, by which the centre of the circle in FIG. 7 is offset from the origin of the I-Q diagram, the DC cancellation circuit 45 derives an approximate measure of how far each "side" of the circle is from the origin, and then uses these measures to estimate the position of the centre of the circle.

A measure of how far the part of the circle within region 1 is spaced from the origin in the I-axis direction is obtained by averaging the I-values of all the points (signal-value pairs) lying in that region. This is equivalent to averaging the respective distances $I_{i1}$ of the points lying in that region from the Q-axis.

Similarly, a measure $Q_{AV2}$ of how far the part of the circle within region 2 is spaced from the origin in the Q-axis direction is obtained by averaging the Q-values of all the points lying within that region. This is equivalent to averaging the respective distances $Q_{i2}$ of the points in region 2 from the I-axis.

Similar measures can be derived for region 3, in which the I-values of the points within the region are averaged to obtain a further measure $I_{AV3}$ in the I-axis direction, and for region 4 in which the Q-values are averaged to obtain a further measure $Q_{AV4}$ in the Q-axis direction. Note that in regions 3 and 4, the absolute I and Q values are averaged, so that the resulting average values (average distances) are always positive.

The average distances are then used as follows to determine I- and Q-shift values $I_{SH}$ and $Q_{SH}$ which, if subtracted from the I- and Q-values respectively of each signal-value pair, would cause the centre of the circle in FIG. 7 to move closer to the origin. The I-direction shift value is determined as:

$$I_{SH}=(I_{AV1}-I_{AV3})/2 \qquad \ldots (5)$$

and the Q-direction shift value is determined as:

$$Q_{SH}=(Q_{AV2}-Q_{AV4})/2 \qquad \ldots (6)$$

where the average distances $I_{AV1}$, $Q_{AV2}$, $I_{AV3}$, $Q_{AV4}$ for the first, second, third and fourth regions are defined $$I_{AV1}=\Sigma I_{i1}/n_1 \qquad \ldots (7)$$

$$Q_{AV2}=\Sigma Q_{i2}/n_2 \qquad \ldots (8)$$

$$I_{AV3}=\Sigma |I_{i3}|/n_3 \qquad \ldots (9)$$

$$Q_{AV4}=\Sigma |Q_{i4}|/n_4 \qquad \ldots (10)$$

$n_1$, $n_2$, $n_3$, and $n_4$ being the numbers of points in each region.

Finally, the I-direction shift value $I_{SH}$ is subtracted from the I-value of each signal-value pair, and the Q-direction shift value $Q_{SH}$ is subtracted from the Q-value of each signal-value pair, as follows:

$$I_i'=I_i-I_{SH} \qquad \ldots (11)$$

$$Q_i\!-\!Q_i\!-\!Q_{SH} \qquad \ldots (12)$$

Figure 8:
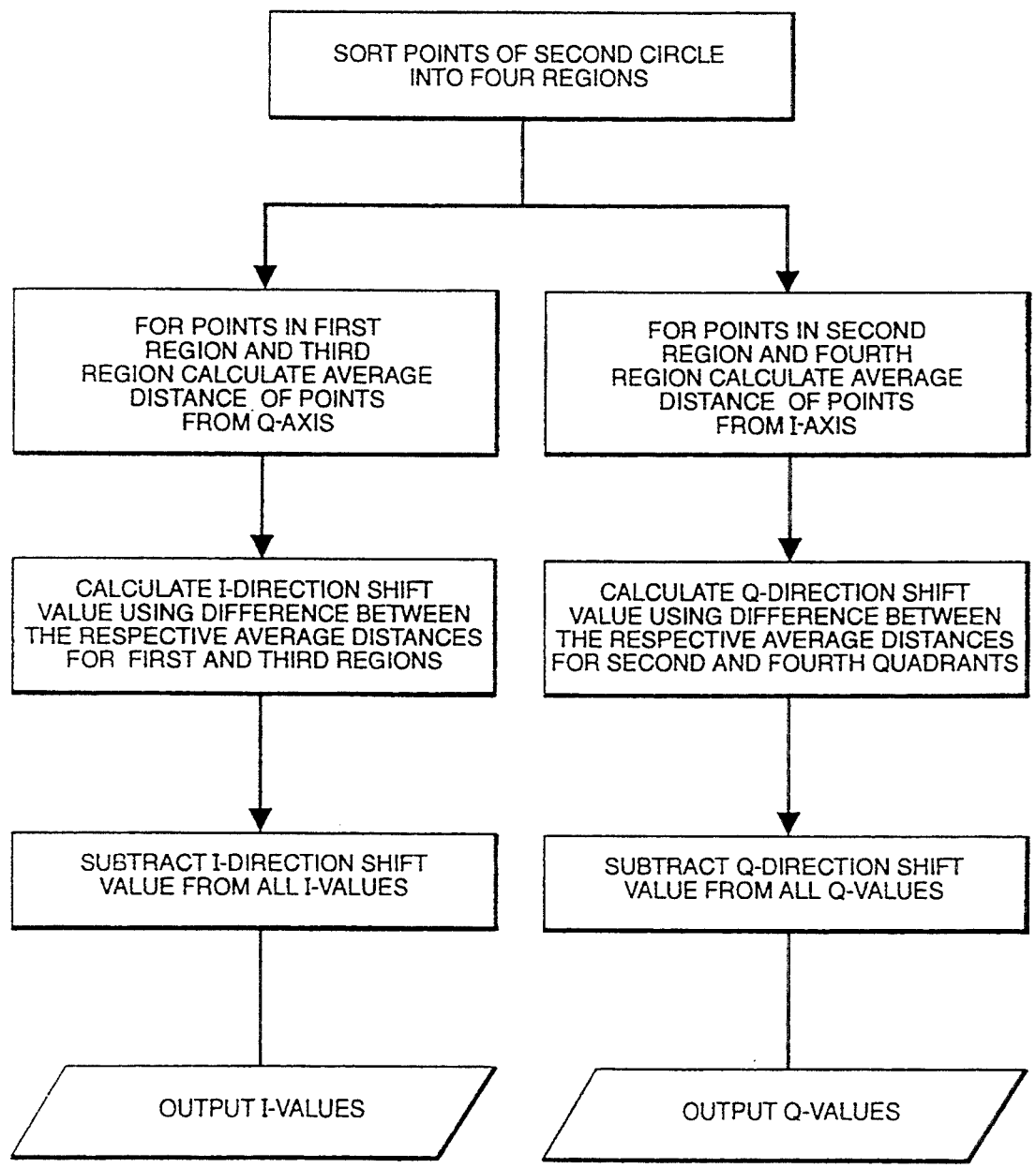
FIG. 8 is a flow chart relating to the DC restoration operation.

The above calculations are shown in the flow chart of FIG. 8.

Figure 9A:
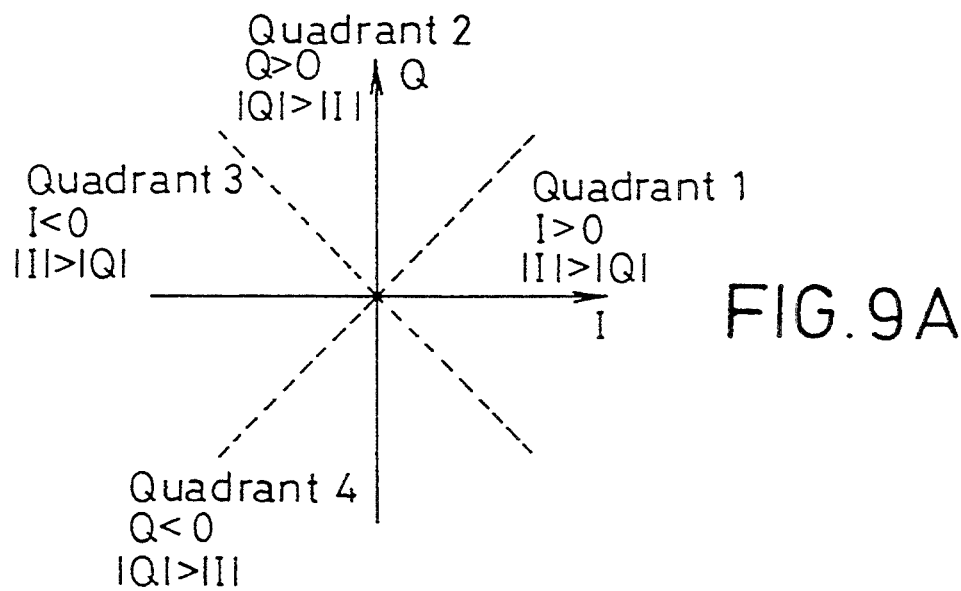
FIGS. 9A to 9C are respective I/Q diagrams for explaining other forms of the DC restoration operation.

Referring now to FIG. 9A, the advantage of defining the regions in the form of quadrants that are bisected by the I and Q axis, will now be explained.

Over the course of a signal burst, the modulation of the received signal will cause it to move around a circle, as viewed on an I-Q diagram. The result is that consecutive I and Q signal-value pairs will not necessarily be adjacent to one another around the circle. This means that, before the average distances mentioned above can be calculated, the signal-value pairs of a burst, which are stored in the above-mentioned memory portion of the DC cancellation circuit 45, must be sorted according to the different regions of the I-Q diagram in which they are located. It is desirable, therefore, that the regions be defined in a manner which permits such sorting to be performed without requiring a great deal of processing.

When the quadrants are defined as shown in FIG. 9A, sorting of the signal-value pairs into the different quadrants requires only simple comparisons and absolute value calculations. For example, signal-value pairs lying within quadrant 1 will satisfy the two inequalities:

$$I>0; \ |I|>|Q| \qquad \ldots (13)$$

Signal-value pairs lying within quadrant 2 will satisfy the two inequalities:
$$Q>0; \ |Q|>|I| \qquad \ldots (14)$$

Signal-value pairs lying within quadrant 3 will satisfy the two inequalities:

$$I<0; \ |I|<|Q| \qquad \ldots (15)$$

Signal-value pairs lying within quadrant 4 will satisfy the two inequalities:

$$Q<0; \ |Q|<|I| \qquad (16)$$

Thus, sorting into quadrants in FIG. 9A only requires three basic operations for each signal-value pair, specifically calculation of absolute values $|I|$ and $|Q|$ for a pair; comparison of I and Q values with 0; and comparison of $|I|$ and $|Q|$ values.

It will, of course, be appreciated that such operations can be performed quickly and simply using digital circuitry or a microprocessor.

By way of example, FIG. 10 shows a DC restoration portion of the DC cancellation circuit 45 of FIG. 3, which portion uses digital circuitry to carry out the DC restoration operation described above. This DC restoration portion carries out the necessary processing to derive the I- and Q-direction shift values $I_{SH}$ and $Q_{SH}$ when the regions are defined as quadrants as shown in FIG. 9A.

As noted previously, the DC cancellation circuit 45 includes a memory portion 101 in which all of the signal-value pairs of a received signal burst are stored. The memory portion 101 is connected to the DC restoration portion for sequentially delivering to that portion the stored signal-value pairs $(I_i, Q_i)$. The stored I- and Q-values of each pair have already been processed, as set out in equations 1 to 4 above, to remove the DC levels $I_{DC}$ and $Q_{DC}$ therefrom.

The DC restoration portion of FIG. 10 comprises absolute value determining circuits 102 and 103, a quadrant sorting circuit 104, respective average distance calculation circuits 105 to 108 for the four quadrants, adders 109 and 110 and divide-by-two circuits 111 and 112.

The absolute value determining circuit 102 receives the I-value $I_i$ of a current signal-value pair being delivered by the memory portion 101, and produces therefrom an equivalent I-value $|I_i|$. Similarly, the absolute value determining circuit 103 simultaneously receives the Q-value $Q_i$ of the current signal-value pair and produces therefrom an equivalent absolute Q-value $|Q_i|$.

The quadrant sorting circuit 104, which receives the values $I_i$, $Q_i$, $|I_i|$ and $|Q_i|$, includes three comparators: a first comparator 121 for comparing the received I-value $I_i$ with zero, a second comparator 122 for comparing the received absolute I-value $|I_i|$ with the corresponding received absolute Q-value $|Q_i|$, and a third comparator 123 for comparing the received Q-value $Q_i$ with zero. The respective outputs of the three comparators 121 to 123 are connected to a quadrant selector logic circuit 124 which derives therefrom four selection signals $SEL_1$, $SEL_2$, $SEL_3$ and $SEL_4$ which are applied respectively to the average distance calculation circuits 105 to 108. The first selection signal $SEL_1$ is activated when the outputs of the comparators 121 to 123 are consistent with the two inequalities set out in equation 13 above being satisfied. The second, third and fourth selection signals $SEL_2$, $SEL_3$, and $SEL_4$ are activated when the inequalities of equations 14 to 16 above are satisfied respectively.

Each average distance calculation circuit 105, 106, 107 or 108 includes an accumulator 131, a counter 132 and a divider 133. The accumulator 131 of the average distance calculation circuit 105 for the first quadrant receives as inputs the I-value $I_i$ of the current signal-value pair and the first selection signal $SEL_1$. Similarly, the average distance calculation circuit 106 for quadrant 3 receives as its inputs the absolute I-value $|I_i|$ of the current signalvalue pair and the third selection signal $SEL_3$. The average distance calculation circuit 107 for the second quadrant receives as its inputs the Q-value $Q_i$ of the current signal-value pair and the second selection signal $SEL_2$. The average distance calculation circuit 108 for the fourth quadrant receives as its inputs the absolute Q-value $|Q_i|$ of the current signal-value pair and the fourth selection signal $SEL_4$.

The respective outputs $I_{AV1}$ and $I_{AV3}$ of the average distance calculation circuits 105 and 106 are applied to the adder 109, and the respective outputs $Q_{AV2}$ and $Q_{AV4}$ of the average distance calculation circuits 107 and 108 are applied to the adder 110. The outputs of the adders 109 and 110 are connected respectively to divide-by-two circuits 110 and 112.

Figure 10A:
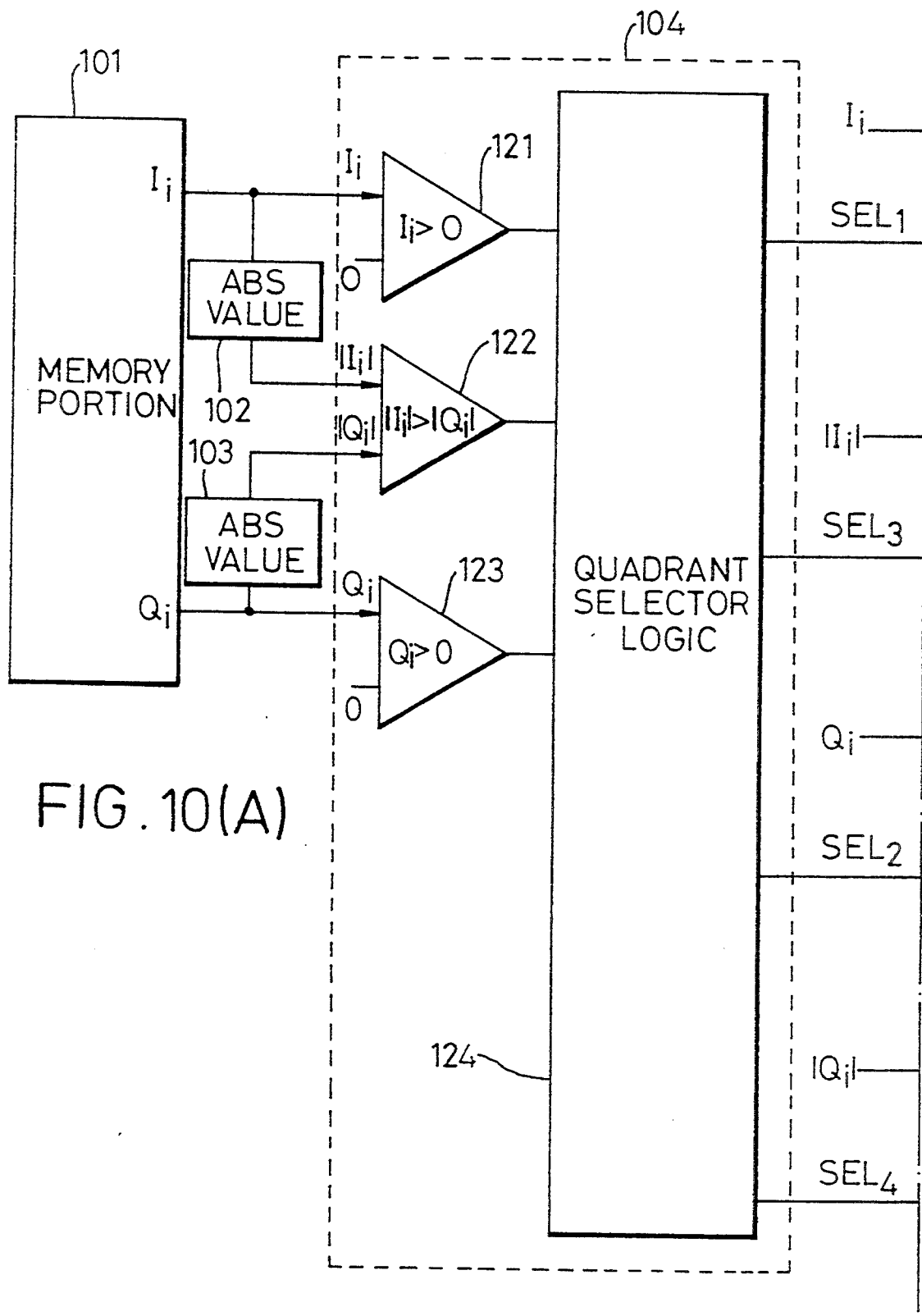
FIGS. 10A and 10B together present a block diagram of a DC restoration portion of the DC cancellation circuit shown in FIG. 3.
Figure 10B:
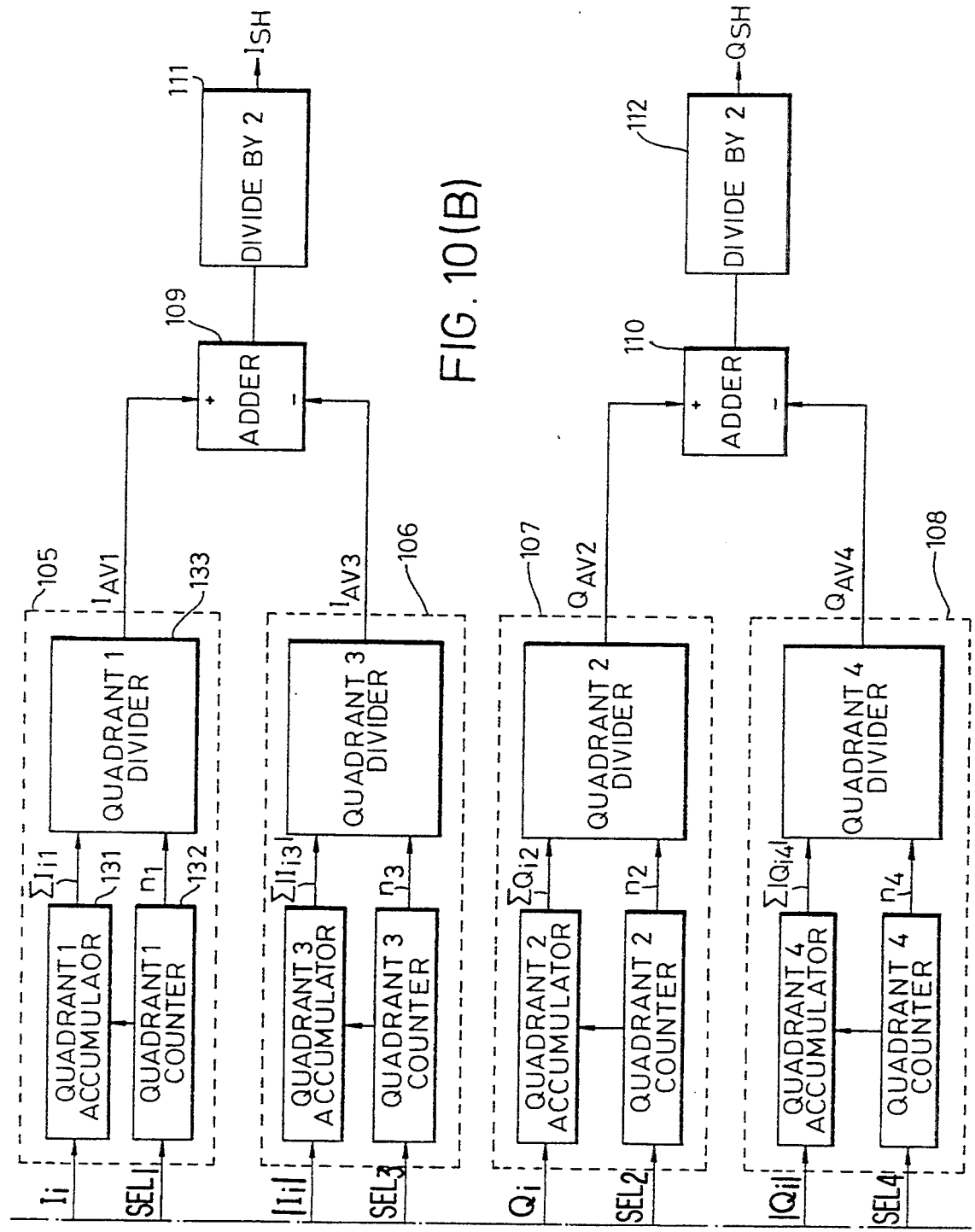

In use of the DC restoration portion shown in FIGS. 10(A) and 10(B) the memory portion 101 outputs the signalvalue pairs in turn for processing by the DC restoration circuit. For each pair the quadrant selector circuit 104 determines in which quadrant the pair is located, and outputs one of the selection signals $SEL_1$ to $SEL_4$ accordingly, so as to select one of the average distance calculation circuits 105 to 108. In response to its selection signal, the selected average distance calculation circuit 105, 106, 107 or 108 increments its counter 132 by one, so as to maintain a count of the number of pairs in its quadrant, and adds the appropriate I or Q value ($I_i$ for quadrant 1; $Q_i$ for quadrant 2; $|I_i|$ for quadrant 3; and $|Q_i|$ for quadrant 4) to its accumulator 131, so as to sum the appropriate distances for all the pairs in its quadrant.

When all of the signal-value pairs have been processed, the divider 133 in each average distance calculation circuit: divides the content of the accumulator 131 by the content of the counter 132 to produce the relevant average distance value $I_{AV1}$, $Q_{AV2}$, $I_{AV3}$ or $Q_{AV4}$ for the quadrant. The average distance value for quadrant 3 is then subtracted from that for quadrant 1 in the adder 109 and the resulting difference is divided by 2 by the divide-by-two circuit 111 to produce the I-direction shift value $I_{SH}$. Similarly, the average distance value $Q_{AV4}$ for quadrant 4 is subtracted from the average distance value $Q_{AV2}$ for quadrant 2 in the adder 110 and the resulting difference is divided by two in the divide-by-two circuit 112 to provide the Q-direction shift value $Q_{SH}$.

Figure 9B:
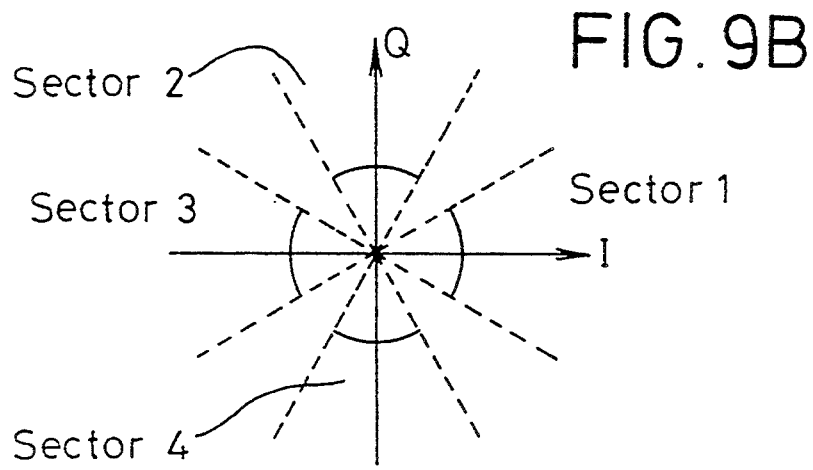
Figure 9C:
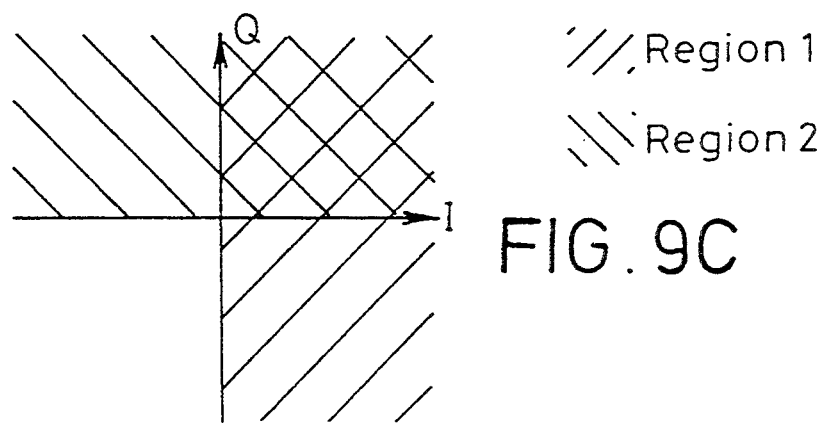

The four regions in which the average distances are calculated can alternatively be defined differently, for example as shown in FIGS. 9B and 9C. In FIG. 9B, the sectors each have a smaller angular spread but, as in FIG. 9A, are bisected by the I and Q axes. For example the angular spread of the first sector may be from $-30°$ to $+30°$, that of the second sector $+60°$ to $+120°$, that of the third sector $+150°$ to $210°$, and that of the fourth sector $+240°$ to $+300°$. The sectors shown in FIG. 9B are, however, less advantageous than the quadrants shown in FIG. 9A, firstly because sorting involves more complex comparison operations, and secondly because there are gaps in between the sectors, so reducing the number of signal-value pairs which can be used to form the average distances. This second disadvantage can be alleviated to some extent by using sectors having larger angular spreads ($>90°$), so that the sectors overlap. In such a case, however, certain points in the overlapping portions of the sectors will be used in two averaging calculations, with the result that processing speed may be compromised.

In FIG. 9C the regions are defined simply as $I>0$, $Q>0$, $I<0$, and $Q<0$ respectively. These region definitions permit simple comparison operations to be carried out for sorting purposes, but again the overlapping nature of the regions means that each signal-value pair will be used in two average distance calculations, so that processing speed will be compromised.

It has already been noted above that the processing operations required to achieve sorting should be as simply as possible. It is also important that the average distance calculation be as simple as possible, whilst providing desirably-accurate results.

In the average distance calculations described above, for simplicity only I or Q values are averaged in each region (quadrant). This means that the calculation can be relatively fast and that simple digital circuits can be used in the average distance calculating circuits.

To improve the accuracy of the I and Q shift values obtained with such simple calculations, it may be appropriate to apply a correction factor to the resulting average I or Q values for the regions, as will now be explained.

Considering an ideal circle, centred on the origin, for a point (signal-value pair) on the circle which is close to the edge of a quadrant, the distance of the point from the relevant I or Q axis is lower than the distance of the point from the origin (i.e. the circle radius) by a factor approaching $1/\sqrt{2}$. On the other hand, for a signal-value pair lying on an axis (i.e. at the centre of a quadrant) there is no difference between the radius and the distance of the point from the relevant axis. By carrying out an integration over a quadrant, it is found that the average of the axis distances is approximately 90% of the radius of the circle. Thus, the average value obtained by averaging only I- or Q-values for a quadrant is approximately 0.9 times the true value, and consequently, so a correction of the average values obtained by equations 7 to 10 above is desirable. Such a correction could be applied by simply multiplying the final I and Q shift: values $I_{SH}$ and $Q_{SH}$ by the appropriate factor ($\approx 1/0.9$ for quadrants)—which is equivalent to dividing the adder outputs by 1.8 instead of 2 -, but in a modification of the FIG. 10 DC restoration portion the correction is applied during calculation of the individual average distances $I_{AV1}$, $Q_{AV2}$, $I_{AV3}$ and $Q_{AV4}$, as will now be explained with reference to FIGS. 11 and 12.

Referring to equations 7, 8, 9 and 10 above, the average distances for the four regions are determined by summing the I- or Q-values in the region and dividing by the number of signal-value pairs that are located within the region concerned. In order to avoid the use of a divider (which is complex to implement in digital circuitry) in the preferred modification the required division operation for each region will be carried out by a small number of summing and/or shifting operations performed on the sum of the I- or Q-values for the region. This will now be explained with reference to Table 1.

TABLE 1

| Number in Quadrant | Take | Lose | Max % Lost | Action | Correction |
| --- | --- | --- | --- | --- | --- |
| 1 | all | 0 | 0 | SUM | 1 |
| 2 | 2 | 0 | 0 | SUM/2 | 1 |
| 3 | 3 | 0 | 0 | SUM/4 + SUM/8 | 1.125 |
| 4,5 | 4 | 0,1 | 20 | SUM/4 | 1 or 1.25 |
| 6–8 | 6 | 0–2 | 25 | SUM/8 + SUM/16 | 1.125 |
| 9–11 | 9 | 0–2 | 18 | SUM/8 | 1.125 |
| 12–17 | 12 | 0–5 | 29 | SUM/16 + SUM/32 | 1.125 |
| 18–23 | 18 | 0–5 | 22 | SUM/16 | 1.125 |
| 23–35 | 24 | 0–11 | 31 | SUM/32 + SUM/64 | 1.125 |
| 36–47 | 36 | 0–11 | 23 | SUM/32 | 1.125 |
| 48–71 | 48 | 0–23 | 32 | SUM/64 + SUM/128 | 1.125 |
| 72+ | 72 | 0+ |  | SUM/64 | 1.125 |

In Table 1, SUM represents the sum of the I- or Q-values (absolute I or Q values in the case of regions 3 and 4) for a quadrant. When there is only one signal-value pair in the quadrant the average I or Q value is simply equal to SUM, as shown in row 1 of the table. When there are two signal-value pairs in the quadrant, the required average is simply half the sum (SUM/2), which can be achieved by simply shifting SUM one place to the right.

When there are three signal-value pairs in the quadrant a combined summing-and-shifting operation is performed:

SUM/4+SUM/8, which is equivalent to dividing by a factor 8/3. This deviates from the true division factor, namely 3, by a factor 1.125, with the result that the average value obtained by the summing-and-shifting operation concerned is too high by the factor 1.125. However, this factor is close to the correction factor ($\approx 1/0.9$) needed to compensate for the fact, mentioned above, that calculating the average distance of the signal-value pairs from the I or Q axis yields a result which is only around 90% of the radius. Thus, the summing-and-shifting operation concerned not only determines the average distance, but also corrects that average distance by the correction factor 1.125.

It will be noted that in the cases mentioned above in which there were 1 or 2 signal-value pairs in the quadrant, it was not possible to apply the correction factor as part of any summing-and-shifting operation. Thus, in these cases, which fortunately in practice occur quite rarely (at least for bursts of reasonable bit lengths), the desired correction of the average cannot be applied.

Similarly, when there are four signal-value pairs in a quadrant the best summing-and-shifting operation is the shifting operation SUM/4, which can be implemented by shifting two places to the right. In this case also, the correction factor 1.125 cannot be applied.

When there are five signal-value pairs, the best operation is still the shifting operation SUM/4, but in this case there is a choice. Either only four of the pairs need be summed to produce the value SUM, in which case it is not possible to apply any correction factor, or alternatively all five pairs can be used, in which case, when the shifting operation SUM/4 is performed, the resulting correction factor will be 1.25. This correction factor is larger than required.

When there are between six and eight signal-value pairs in a quadrant, the best approach is to take only six of the pairs (losing up to two pairs or 25% of the pairs involved) and to perform the combined summing-and-shifting operation

SUM/8+SUM/16, which is equivalent to dividing by 16/3. Because the ratio of this division factor 16/3 to the true division factor 6 is 1.125, this operation results in the desired correction factor 1.125 being applied. As shown in Table 1, similar shifting or combined summing-and-shifting operations are possible for higher numbers of signal-value pairs in the quadrant, in each case the operation being such as to apply the desired correction factor of 1.125 to the resulting average.

As noted above, different shifting or summing-and-shifting operations must be used according to the number of signal-value pairs in a given quadrant. However, it is not possible to know in advance how many signal-value pairs will fall into each quadrant. This presents a problem in calculating the above-mentioned value SUM. For example, if there are fifteen signalvalue pairs in a quadrant, we would only wish to take account of twelve of the signal value pairs for the purposes of calculating SUM, because twelve pairs are necessary to obtain the correction factor 1.125 when the summing-and-shifting operation is SUM/16+SUM/32, as shown in row 7 of Table 1.

To solve this problem, a modified average distance calculation circuit 150 can be used in place of each of the average distance calculation circuits 105 to 108 shown in FIG. 10. As before, the circuit 150 receives as an input the I-value $I_i$ or Q-value $Q_i$ (or $|I_i|$ or $|Q_i|$) of the current signal-value pair from the memory portion 101, together with a selection signal SEL from the comparison circuit 104. Also, the circuit 150 delivers as its output an average distance value $I_{AV}$ or $Q_{AV}$. However, the internal constitution of the circuit 150 is different from that of the circuits 105 to 108 in FIG. 10.

The circuit 150 includes a first accumulator ($A_1$) 151, a second accumulator ($A_2$) 152, a first counter ($C_1$) 153, a second counter ($C_2$) 154, a sum-and-shift circuit 155, an averaging control circuit 156 and a look-up table 157.

The first accumulator $A_1$ has an output which is connected to an input of the second accumulator $A_2$, and the first counter $C_1$ has an output connected to an input of the second counter $C_2$.

Operation of the modified average distance calculation circuit 150 of FIG. 11 will now be explained with reference to FIG. 12. Such operation is controlled by the averaging control circuit 156.

Figure 11:
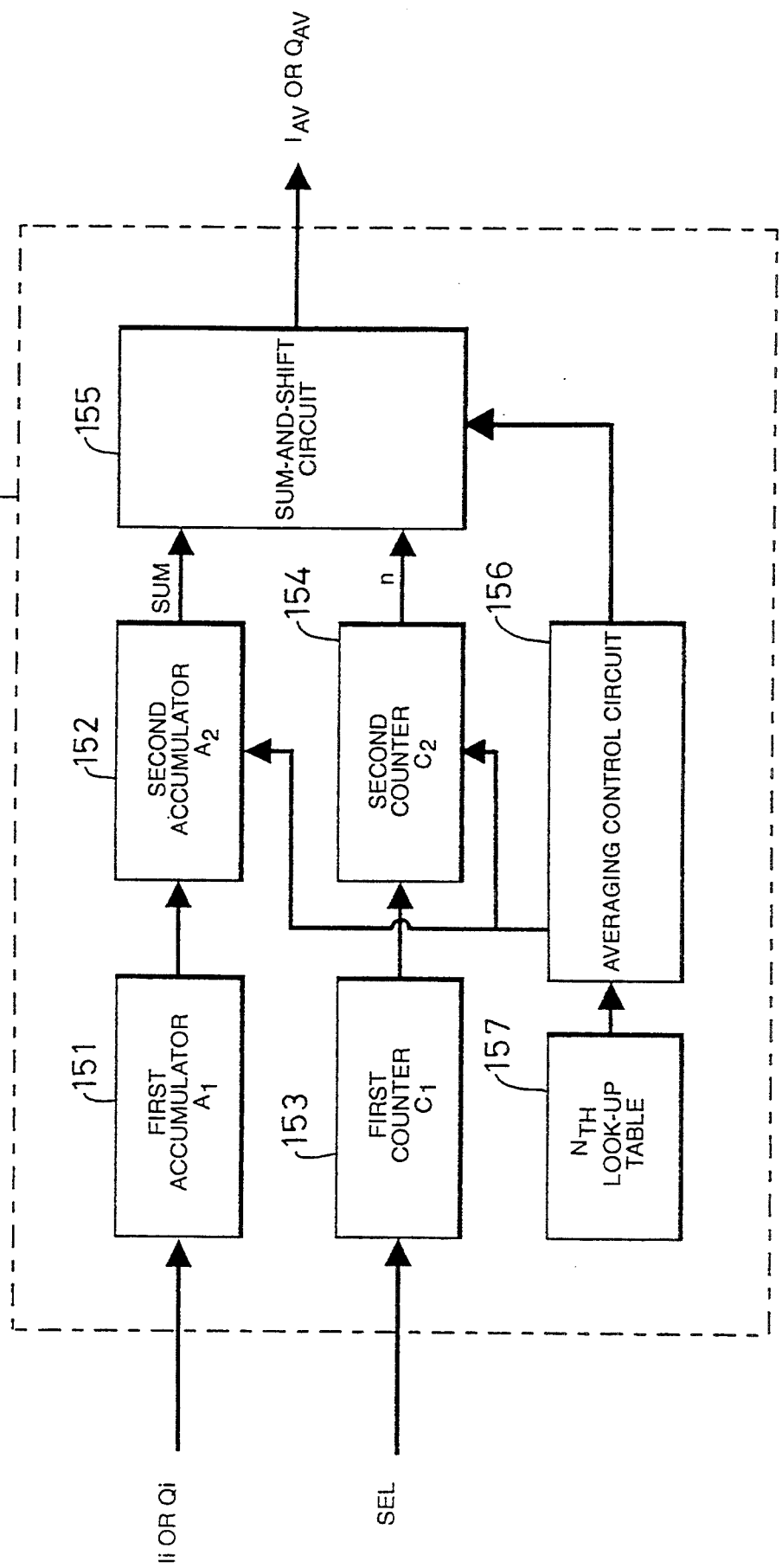
FIG. 11 shows a modified part of the FIG. 10 DC restoration portion.
Figure 12:
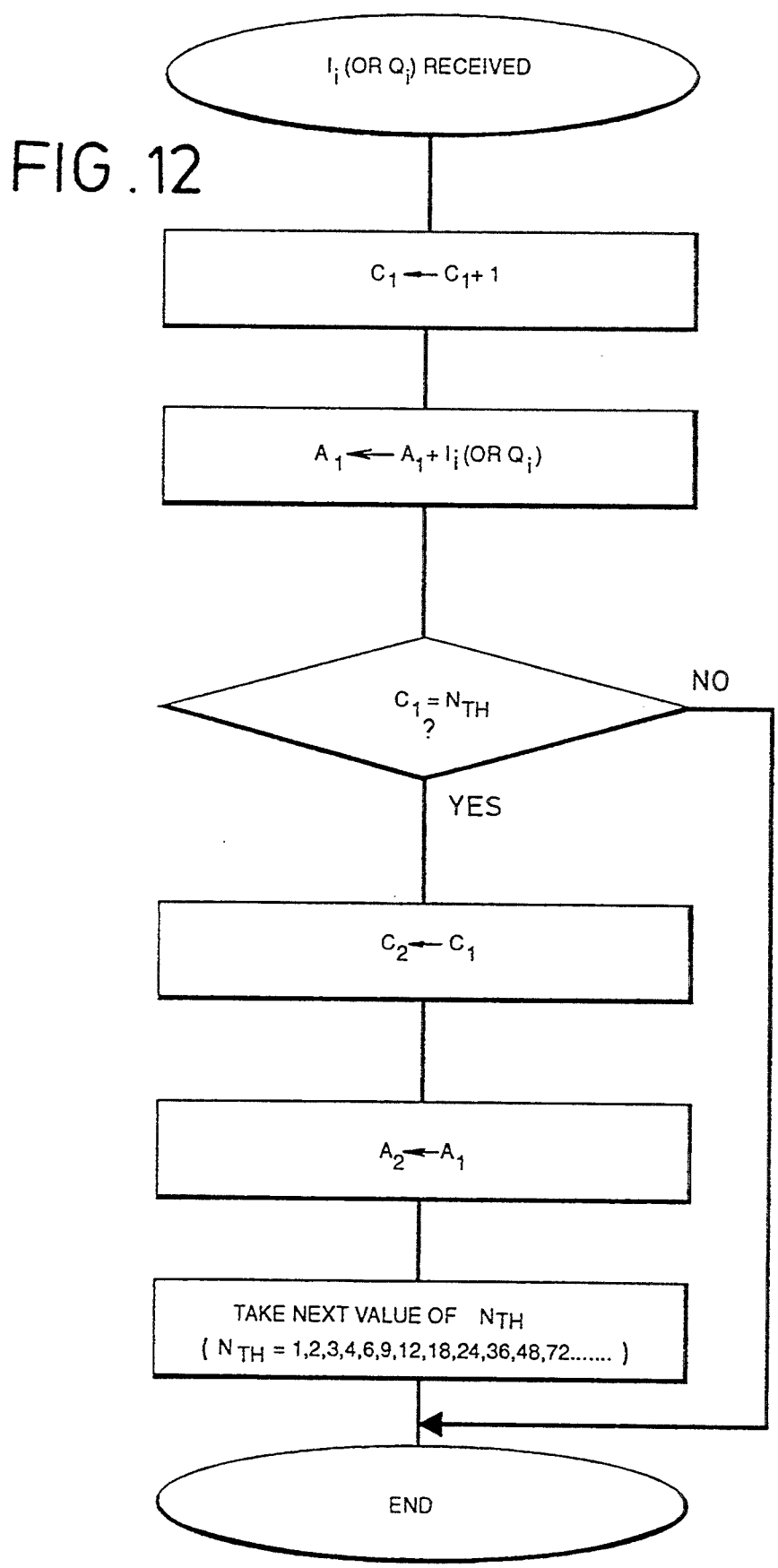
FIG. 12 is a flow chart relating to operation of the FIG. 11 modified part.

By way of example, it will be assumed that the circuit 150 of FIG. 11 is used for the first quadrant (and so is required to accumulate I-values $I_i$ for the first quadrant), and that in the burst being processed there are fifteen signal-value pairs in the first quadrant. Initially the counters $C_1$ and $C_2$ and the accumulators $A_1$ and $A_2$ are reset to zero and a first threshold value $N_{TH}$ (see FIG. 12) is taken from the look-up table 157, i.e. $N_{TH}$ is set to 1.

When the first signal-value pair within quadrant 1 is received (the selection signal $SEL_1$ for quadrant 1 being active) the first counter $C_1$ is incremented by 1 and the received I-value $I_i$ is added to the first accumulator $A_1$. Because the count value in the first counter $C_1$ is then equal to the first threshold value NTH the content of the first counter $C_1$ is loaded into the second counter $C_2$, and the content of the first accumulator $A_1$ is loaded into the second accumulator $A_2$. The next threshold value $N_{TH}$, namely 2, is then taken from the look-up table 157.

In this way it can be seen that, whereas the first accumulator $A_1$ and first counter $C_1$ are updated (in precisely the same way as the counter 132 and accumulator 131 in the circuits 105 to 108 of FIG. 10) each time a signal-value pair for the quadrant is received and so consequently, serve to maintain continuous total and count values respectively, the second counter $C_2$ and second accumulator $A_2$ are only updated when the count value in the first counter $C_1$ reaches one of the predetermined threshold values $N_{TH}$. As shown in FIG. 12 these threshold values accord with the values indicated in the "take" column in Table 1. Thus, in the present example, when the fifteenth signal-value pair in quadrant 1 is processed, whereas the first accumulator $A_1$ will contain the total of the I-values of all fifteen signal-value pairs, the second accumulator $A_2$ will contain only the total of the I-values of the first twelve pairs in the quadrant. This means that the content of the second accumulator $A_2$ can be used to provide the required total value SUM for use by the sum-and-shift circuit 155, the content of the first accumulator $A_1$ being simply disregarded.

The sum-and-shift circuit 155 simply performs the appropriate shifting operation or combined summing-and-shifting operation according the number of pairs used in the quadrant, based on the count value n held in the second counter $C_2$ when processing of all the signal-value pairs has been completed.

FIGS. 13A–C, 14A–C and 15A–C present simulations, under different signal quality conditions, of the operation of the DC restoration portion of FIG. 10, using the modified (divider-less) average distance calculation circuits operating according to Table 1.

Figure 13A:
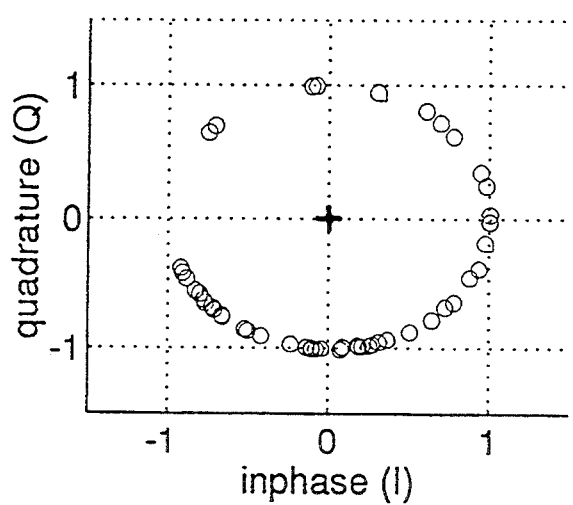
FIGS. 13A, B and C, 14A, B and C, and 15A, B and C present I/Q diagrams based upon simulations, under different signal conditions, of the operation of the FIG. 10 DC restoration portion.

In FIG. 13, the signal-to-noise ratio is 40dB (very good), so that, as shown in FIG. 13A, the signal-value pairs of a burst lie accurately on a common circle. This common circle is shown centred precisely on the origin, hence the common circle represents an original signal that is free from DC offsets. The original signal is represented in this way for clarity only; normally, as discussed above, the original signal would have a significant DC offset, so that the centre of the common circle for the original signal would be offset significantly from the origin (as shown by the first circle $PL_1$ in FIG. 6).

Figure 13B:
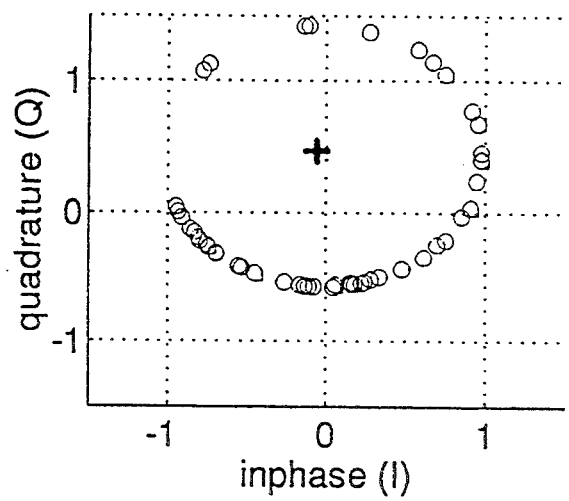

FIG. 13B shows the position of the signal-value pairs of the I-Q diagram after subtraction of the average I and Q values $I_{DC}$ and $Q_{DC}$, i.e., after applying equations 1 and 2 above to all signal-value pairs. Because there were significantly more signal-value pairs in the lower half of the common circle in FIG. 13A than in the upper half, and marginally more pairs in the left-hand half than in the right-hand half of the circle, the centre of the shifted common circle in FIG. 13B is significantly above and marginally to the left of the origin.

Incidentally, the circle would have ended up offset from the origin as shown in FIG. 13B even if the original signal had included DC offsets, as would normally be the case.

Figure 13C:
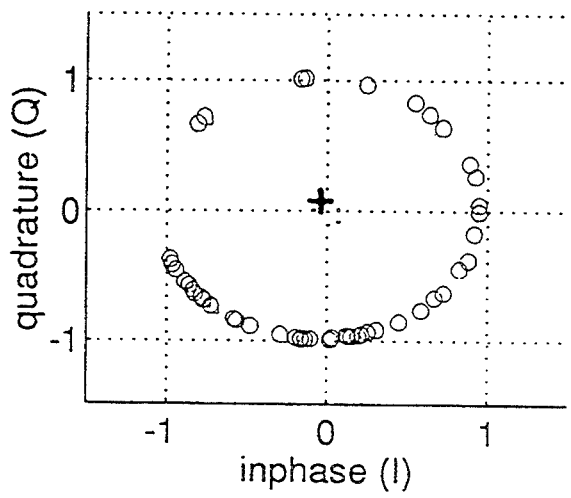
Figure 14A:
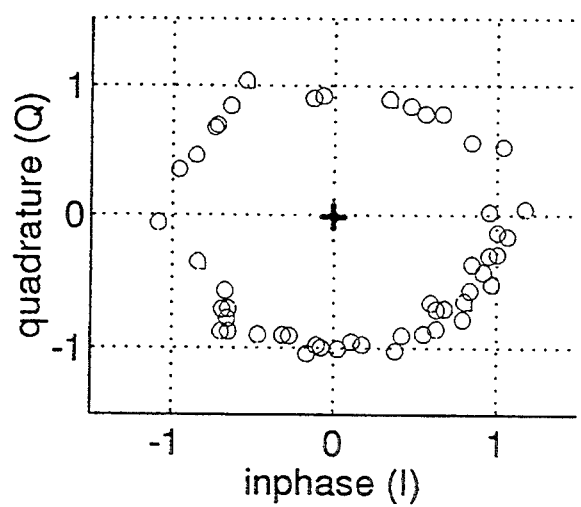
Figure 14B:
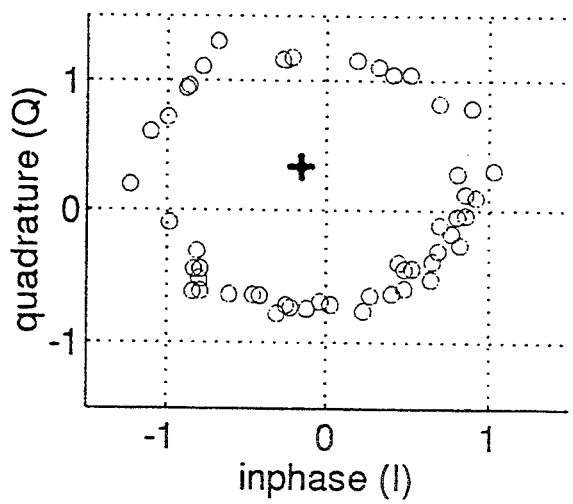
Figure 14C:
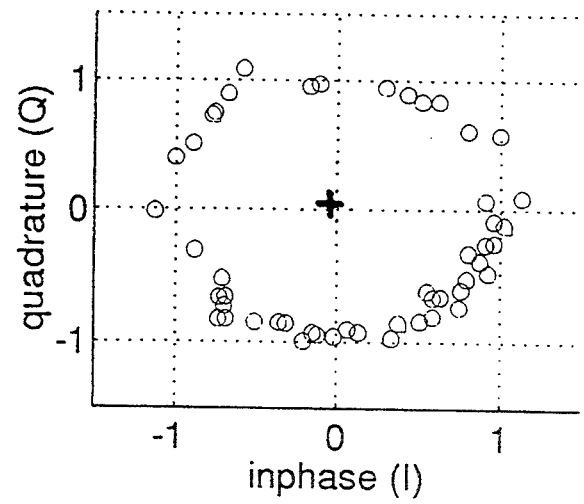
Figure 15A:
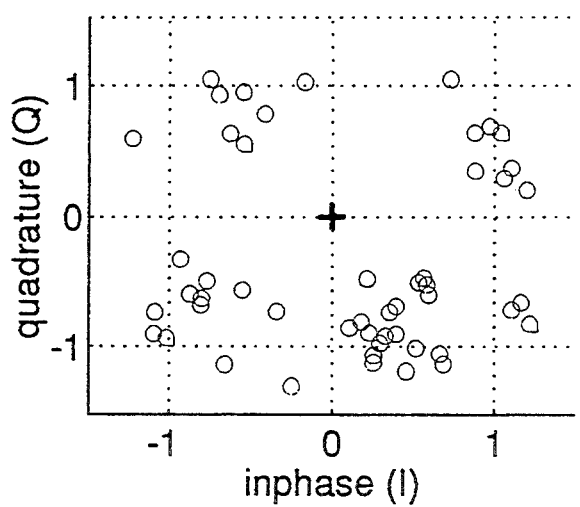
Figure 15B:
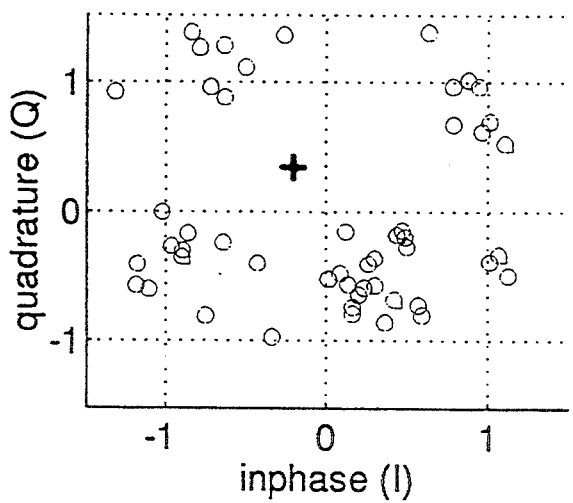
Figure 15C:
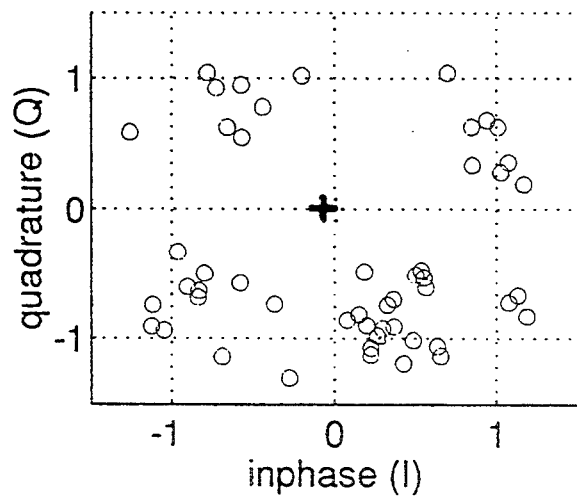

As shown in FIG. 13C, according to the DC restoration operation described above, after DC restoration the common circle ends up with its centre very close to the origin once more, which is the required result. As can be seen from FIGS. 14A and 15A–C, in which the signal-to-noise ratio of the original signal are 20dB and 10dB respectively, the DC restoration operation carried out by the FIG. 10 DC restoration portion remains highly accurate even when the signal-to-noise ratio deteriorates.

Figure 16:
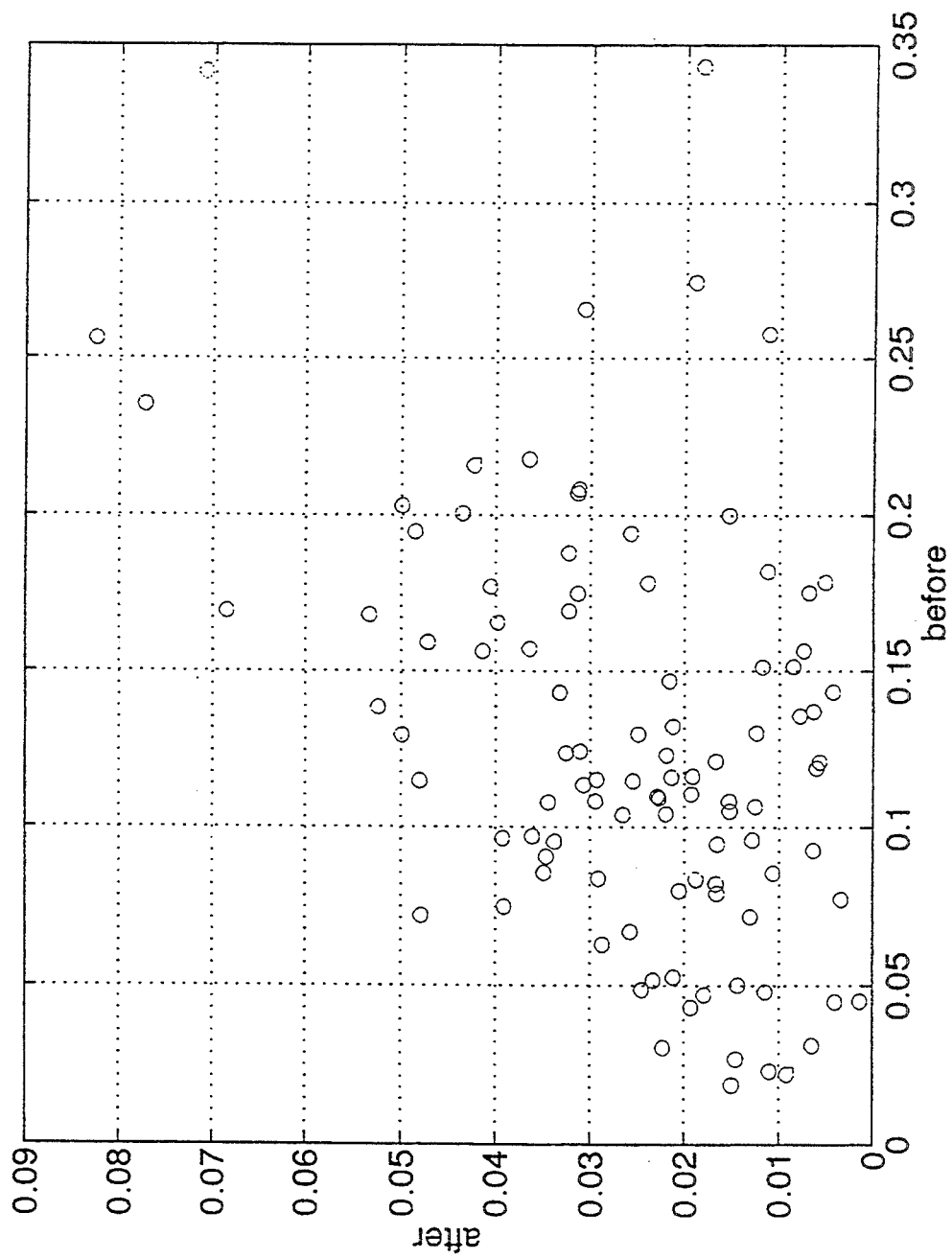
FIG. 16 is a DC error diagram illustrating operation of the DC restoration portion of FIG. 10.

Finally, FIG. 16 shows a DC error diagram showing operation of the FIG. 10 DC restoration portion for 100 different bursts, each burst consisting of 128 bits under Gaussian minimum shift keying (GMSK). In FIG. 16 the size of the offset of the centre of the plotted circle before restoration (i.e. after average subtraction, as in FIG. 13B) is measured along the horizontal axis whilst the size of the offset of the circle centre after DC restoration (as in FIG. 13C) is measured along the vertical axis.

The points in FIG. 16, which each represent one burst, suggest that the DC error is reduced, on average, by a factor of around 4 as a result of the DC restoration operation.

Thus, embodiments of the present invention can perform desirably accurate DC restoration on digital baseband I and Q values, following DC cancellation, so as to permit satisfactory operation of an equalizer or the like used to derive the data content from those values.

Because the DC cancellation and restoration operations are relatively simple they can be performed, without using multipliers or dividers, with desirably low latency consistent with the timing constraints imposed by present communication systems such as GSM.

It will be appreciated that, in different embodiments, the present invention can be applied to other burst-based phase- or frequency-modulated constant sample amplitude communication systems in which the received signal is processed to produce inphase and quadrature baseband signals, irrespective of how those signals are produced in the receiving apparatus.

What we claim is:

1. A method of processing a received signal comprising a carrier wave modulated with digital data signals, said method comprising the steps of:
   (a) demodulating the received signal to produce a set of digital baseband signal-value pairs, each pair being comprised of an inphase signal value and a corresponding quadrature signal value such that, when plotted on an I-Q diagram with the inphase signal value of each pair denoting distance of a plotted point from a Q-axis, and the corresponding quadrature signal value of that pair denoting distance of said plotted point from an I-axis that is orthogonal to said Q-axis, said plotted points would lie substantially on a first circle whose centre is offset from the origin of the diagram, said origin being at the intersection of said I- and Q-axes;
   (b) averaging said inphase signal values of said pairs to produce an I-direction mean value, and averaging said quadrature signal values of said pairs to produce a Q-direction mean value;
   (c) subtracting said I-direction mean value and said Q-direction mean value respectively from the inphase signal value and the quadrature signal value of each of said signal-value pairs so as to produce a set of adjusted signal-value pairs which, when plotted on said I-Q diagram, would produce a new set of plotted points lying substantially on a second circle such that said origin lies within the second circle;
   (d) defining first, second, third and fourth regions of the I-Q diagram, the first and third regions being symmetrical to one another with respect to said Q-axis, and the second and fourth regions being symmetrical to one another with respect to said I-axis;
   (e) determining for each of the said first and third regions, an average distance between said Q-axis and the plotted points of the new set that are located within the region concerned, and using a difference between the average distances of the first and third regions to produce an I-direction shift which, when subtracted from the inphase signal values of the points of the new set, causes the centre of the second circle to move closer to said Q-axis;
   (f) determinings for each of the said second and fourth regions, the average distance between said I-axis and the plotted points of the new set that are located within the region concerned, and using a difference between the average distances of the second and fourth regions, to produce a Q-direction shift value which, when subtracted from the quadrature signal values of the plotted points of the new set, would cause the centre of the second circle to move closer to said I-axis; and
   (g) subtracting said I-direction shift value from each of said inphase signal values of the plotted points of said new set, and subtracting said quadrature signal values of said plotted points, and delivering the resulting inphase and quadrature values as output signals.

2. A method as claimed in claim 1, wherein said regions are quadrants delimited by first and second orthogonal lines that intersect at said origin, the angle between the said first line and the I-axis being 45°.

3. A method as claimed in claim 2, wherein said I-direction shift value is substantially equal to said difference between the respective average distances for the first and third regions, divided by 1.8, and said Q-direction shift value is substantially equal to said difference between the respective average distances for the second and fourth regions, divided by 1.8.

4. A method as claimed in claim 1, wherein all of the plotted points of the new set that are located in each region are used to determine said average distance for the region.

5. An apparatus for processing a received signal comprising a carrier wave modulated with digital data signals, which apparatus comprises:

demodulation means for demodulating the received signal to produce a set of digital baseband signal-value pairs, each pair being comprised of an inphase signal value and a corresponding quadrature signal value such that, when plotted on an I-Q diagram with the inphase signal value of each pair denoting distance of a plotted point from a Q-axis, and the quadrature signal value of that pair denoting distance of said plotted point from an I-axis that is orthogonal to said Q-axis, the plotted points would lie substantially on a first circle whose centre is offset from the origin of the diagram, said origin being at the intersection of the I- and Q-axes;

averaging means for averaging said inphase signal values to produce an I-direction means value, and for averaging said quadrature signal values to produce a Q-direction mean value;

first adjustment means for subtracting said I-direction means value and said Q-direction mean value; respectively, from the inphase signal value and the quadrature signal value of each of said signal-value pairs so as to produce a set of adjusted signal-value pairs which, when plotted on said I-Q diagram, would produce a new set of plotted points lying substantially on a second circle such that said origin lies within that circle;

region defining means for defining first, second, third and fourth regions of the I-Q diagram, the first and third regions being symmetrical to one another with respect to said Q-axis, and the second and fourth regions being symmetrical to one another with respect to said I-axis;

I-shift calculating means coupled to said region defining means and operable, for each of said first and third regions, for determining an average distance between said Q-axis and said plotted points of the new set that are located within the region concerned, and using a difference between the determined average distances of the first and third regions to produce an I-direction shift value which, when subtracted from the inphase signal values of the plotted points of the new set, would cause the centre of the second circle to move closer to said Q-axis;

Q-shift calculating means coupled to said region defining means and operable, for each of said second and fourth regions, for determining an average distance between said I-axis and said plotted points of the new set that are located within the region concerned, and using a difference between the determined average distances of the second and fourth regions to produce a Q-direction shift value which, when subtracted from the quadrature signal values of the plotted points of the new set, would cause the centre of the second circle to move closer to said I-axis; and second adjustment means for subtracting said I-direction shift value from each of the said inphase signal values of the points of said new set, and for subtracting said Q-direction shift value from each of said quadrature signal values of the plotted points of the new set, and for delivering the resulting inphase and quadrature values as output signals.

6. An apparatus as claimed in claim 5, further comprising:

a memory coupled to said first adjustment means, for storing the inphase and quadrature signal values of all said adjusted signal-value pairs; and sorting means, coupled to said memory for receiving therefrom the stored inphase and quadrature values of said adjusted signal-value pairs in turn, said sorting means comprising:

comparator means operative, for each adjusted signal-value pair received from said memory, for comparing the inphase signal value of the adjusted signal-value pair with zero, comparing the quadrature signal value of the adjusted signal-value pair with zero and comparing the absolute inphase signal value of the adjusted signal-value pair with the absolute quadrature signal value of the adjusted signal-value pair; and selection means, connected to said comparator means and operative, in dependence upon the results of the three comparisons performed thereby, for producing selection signals indicative of the region in which the adjusted signal-value pair lies, and wherein said I-shift calculating means and said Q-shift calculating means receive said selection signals and operate in response to said selection signals.

7. An apparatus as claimed in claim 5, wherein said I-direction shift calculating means includes two average distance calculating circuits, for said first and third regions respectively, wherein said Q-direction shift calculating means includes a further two average distance calculating circuits, for said second and fourth regions respectively, and wherein each of said average distance calculating circuits includes accumulator means connected for calculating a sum of the respective distances from at least one of said Q-axis and said I-axis of said plotted points of the new set that are located within the region concerned, and counter means connected for counting the number of said plotted points used to calculate said sum; and said apparatus further comprising divider means, coupled to said accumulator means and said counter means, operable for dividing said sum by said number to produce said average distance for the region concerned.

8. An apparatus as claimed in claim 7, wherein said divider means are operative to produce said average distance by means of a shifting operation or a shifting-and-adding operation performed on said sum, which operation is selected in dependence upon said number.

9. An apparatus as claimed in claim 8, wherein said divider means performs said shifting operation or shifting-and-adding operation, such that said sum is divided by 1.125.

10. An apparatus as claimed in claim 8, wherein said shifting-and-adding operation of said divider means consists of first and second shifting operations, performed on said sum to produce respective first and second shifted sum values, followed by an adding operation in which said first and second shifted sum values are added together to produce said average distance.

11. An apparatus as claimed in claim 7, wherein said counter means of each of said average distance calculating circuits comprises:
- a first counter for counting plotted points of said new set that are located in the region concerned;
- a second counter having an input connected to an output of said first counter;
- a first accumulator for summing said respective distances, from said Q-axis or said I-axis, of all points in the respective region; and
- a second accumulator, having an input connected to an output of said first accumulator, said first counter and said first accumulator being updated each time a point of said new set within the region concerned is received, and wherein each average distance calculating circuit further comprises averaging control means operative for comparing content of the first counter with a predetermined threshold value, and when the content of the first counter has reached the predetermined threshold value, transferring the content of the first counter to the second counter and transferring the content of the first accumulator to the second accumulator, the content of said second counter and the content of said second accumulator providing said number and said sums, respectively, for use by said divider means.

12. An apparatus as recited in claim 5, wherein said apparatus is operable in a digital radio communication system, and wherein said apparatus further comprises:
- a radio-frequency receive portion, coupled to said demodulation means, to receive a radio signal to be demodulated; and
- circuitry, coupled to said second adjustment means, to derive data from said output signals.

13. An apparatus as claimed in claim 12, wherein said digital radio communication system is a global system for mobile communications system or a system using similar RF modulation.

* * * * *

UNITED STATES PATENT AND TRADEMARK OFFICE
CERTIFICATE OF CORRECTION

PATENT NO. : 5,442,655
DATED : August 15, 1995
INVENTOR(S) : Dedic et al.

It is certified that error appears in the above-indentified patent and that said Letters Patent is hereby corrected as shown below:

```
Title page, Item [30] "...Priority Data" change "9211712" to --9211712.6--.
Col 1, line 26, change "(0)" to --(Q)--.
Col. 3, line 23, change "Z" to --I--.
Col. 9, line 37, at the beginning formula before "²" insert --I--.
Col. 12, line 62, change "ISH" to --I_SH--.
Col. 16, line 16, after "portion" insert --,--;
        line 26, after "modification" insert --,--.
Col. 18, line 39, after "10" insert --,--;
        line 46, after "12" insert --,--.
Col. 19, line 4, after "orgin" change "," to --;--;
        line 5, after "hence" insert --,--;
        line 31, change "14A" to --14A-C--.
Col. 21, line 31, after "value" change ";" to --,--.
```

Signed and Sealed this

Fifth Day of December, 1995

Attest:

BRUCE LEHMAN

*Attesting Officer*  *Commissioner of Patents and Trademarks*